US012554084B2

(12) United States Patent
Vermeulen et al.

(10) Patent No.: US 12,554,084 B2
(45) Date of Patent: Feb. 17, 2026

(54) INTEGRATED PHOTONICS ASSEMBLIES

(71) Applicant: SiPhox, Inc., Cambridge, MA (US)

(72) Inventors: Diedrik Rene Vermeulen, Cambridge, MA (US); Michael Zalmon Dubrovsky, Cambridge, MA (US); Michael Whitson, Cambridge, MA (US)

(73) Assignee: SiPhox, Inc., Cambridge, MA (US)

( * ) Notice: Subject to any disclaimer, the term of this patent is extended or adjusted under 35 U.S.C. 154(b) by 636 days.

(21) Appl. No.: 17/898,473

(22) Filed: Aug. 29, 2022

(65) Prior Publication Data
US 2023/0126378 A1    Apr. 27, 2023

Related U.S. Application Data

(63) Continuation of application No. PCT/US2021/020033, filed on Feb. 26, 2021.
(Continued)

(51) Int. Cl.
*G02B 6/12*    (2006.01)
*G02B 6/42*    (2006.01)

(52) U.S. Cl.
CPC ....... *G02B 6/4292* (2013.01); *G02B 6/12004* (2013.01); *G02B 6/4225* (2013.01); *G02B 6/4231* (2013.01)

(58) Field of Classification Search
CPC ...................................................... G02B 6/12
(Continued)

(56) References Cited

U.S. PATENT DOCUMENTS 10,754,091 B1 *   8/2020   Nagarajan ............ G02B 6/4246
10,895,690 B1     1/2021   Doerr et al.
(Continued)

FOREIGN PATENT DOCUMENTS

CN    102713703 A  * 10/2012   ......... G02B 6/12004
CN    108885321 A  * 11/2018   ........... G02B 6/3518
(Continued)

OTHER PUBLICATIONS

PCT/US2021/020033 International Preliminary Report on Patentability dated Aug. 30, 2022.
(Continued)

*Primary Examiner* — Kaveh C Kianni
(74) *Attorney, Agent, or Firm* — Caldwell Intellectual Property Law

(57) ABSTRACT

Disclosed herein are integrated photonics assemblies, circuits, systems and methods therefor. The systems can include a first integrated photonics assembly having a first functionality, in which the first assembly includes a plurality of modular photonic integrated subcircuits. Each subcircuit can be pre-fabricated and can be configured to transfer light to and receive light from another subcircuit based on the first functionality. An output port of a first subset of the subcircuits can be configured to be aligned with an input port of a second subset of the subcircuits. At least one subcircuit can be configured to be removed from the first integrated photonics assembly and connected to a second integrated photonics assembly having a second functionality. The first integrated photonics assembly can be different from the second integrated photonics assembly and the first functionality can be different from the second functionality.

31 Claims, 39 Drawing Sheets

Related U.S. Application Data

(60) Provisional application No. 63/017,864, filed on Apr. 30, 2020, provisional application No. 63/009,633, filed on Apr. 14, 2020, provisional application No. 62/982,545, filed on Feb. 27, 2020.

(58) Field of Classification Search
USPC .......................................................... 385/52
See application file for complete search history.

(56) References Cited

U.S. PATENT DOCUMENTS

| | | | | |
|---|---|---|---|---|
| 2005/0259925 | A1* | 11/2005 | Asari | G02B 6/43 385/89 |
| 2017/0160484 | A1* | 6/2017 | Way | H04J 14/0219 |
| 2020/0387013 | A1* | 12/2020 | Palani | G02F 1/292 |
| 2021/0048587 | A1* | 2/2021 | Denoyer | H01L 24/81 |
| 2021/0152243 | A1* | 5/2021 | Hosseini | H04B 10/1123 |

FOREIGN PATENT DOCUMENTS

| | | | | |
|---|---|---|---|---|
| CN | 110908105 A | * | 3/2020 | ............ G02B 17/06 |
| JP | 7362727 B2 | * | 10/2023 | ............... G02F 1/21 |
| WO | WO-2016070186 A1 | | 5/2016 | |
| WO | WO-2018005959 A1 | | 1/2018 | |
| WO | WO-2021174087 A1 | | 9/2021 | |

OTHER PUBLICATIONS

PCT/US2021/020033 International Search Report and Written Opinion dated Jun. 9, 2021.

* cited by examiner

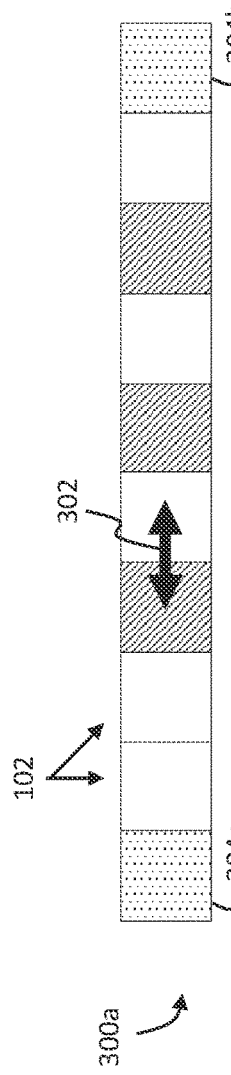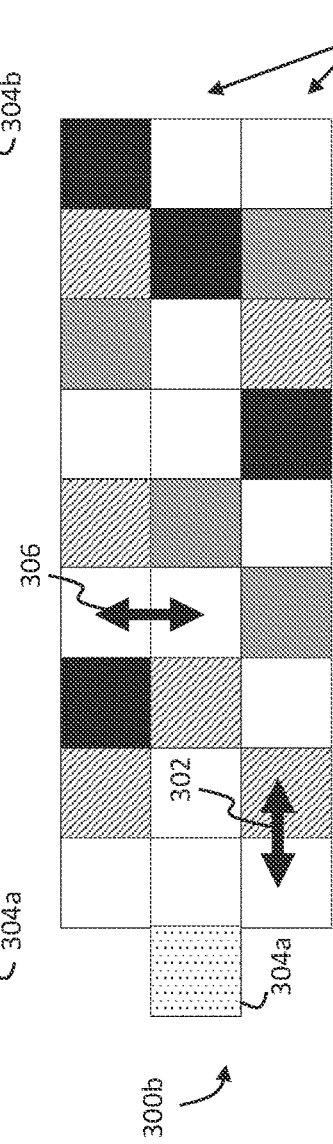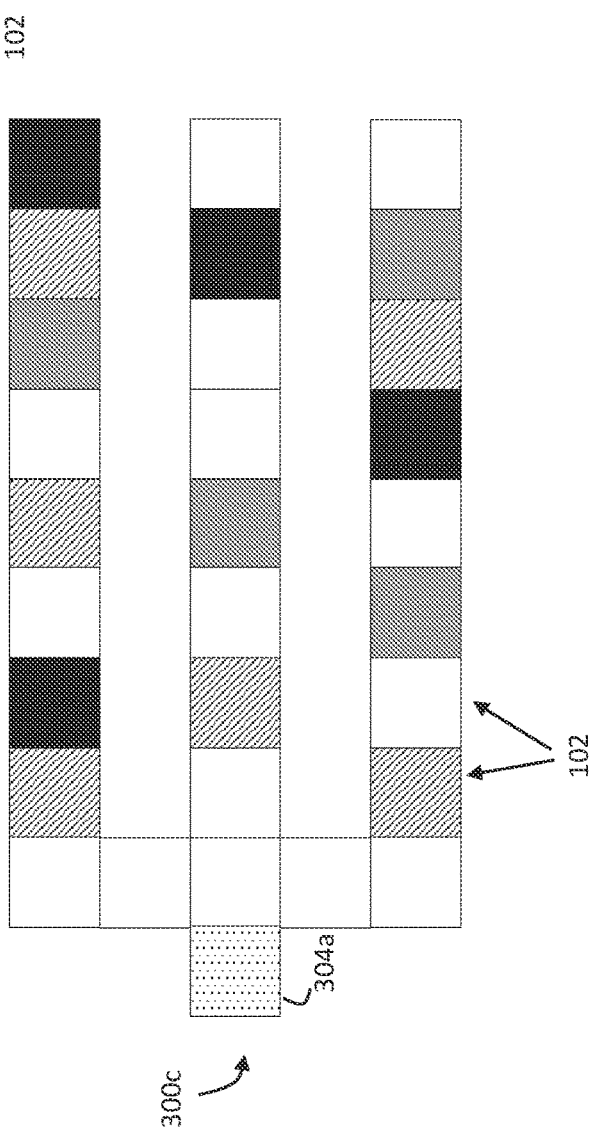

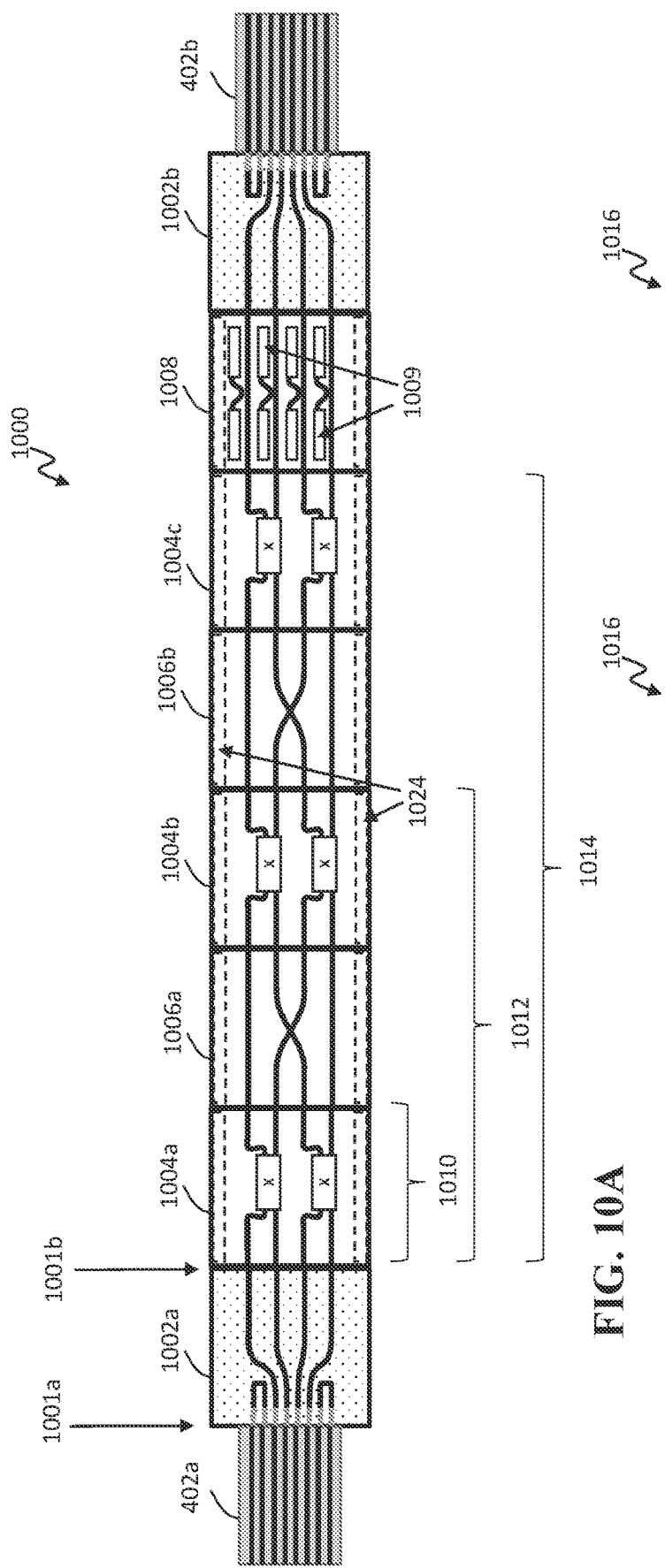
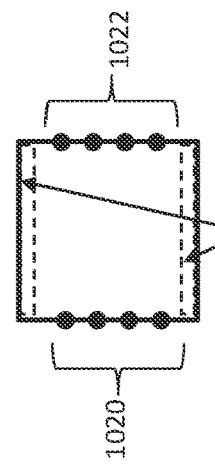
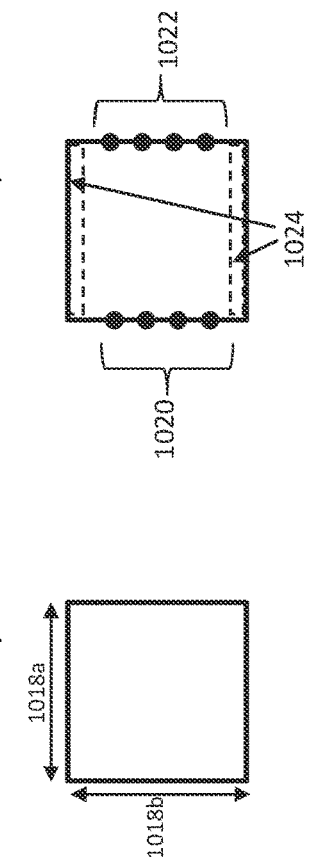
FIG. 10A
FIG. 10B
FIG. 10C

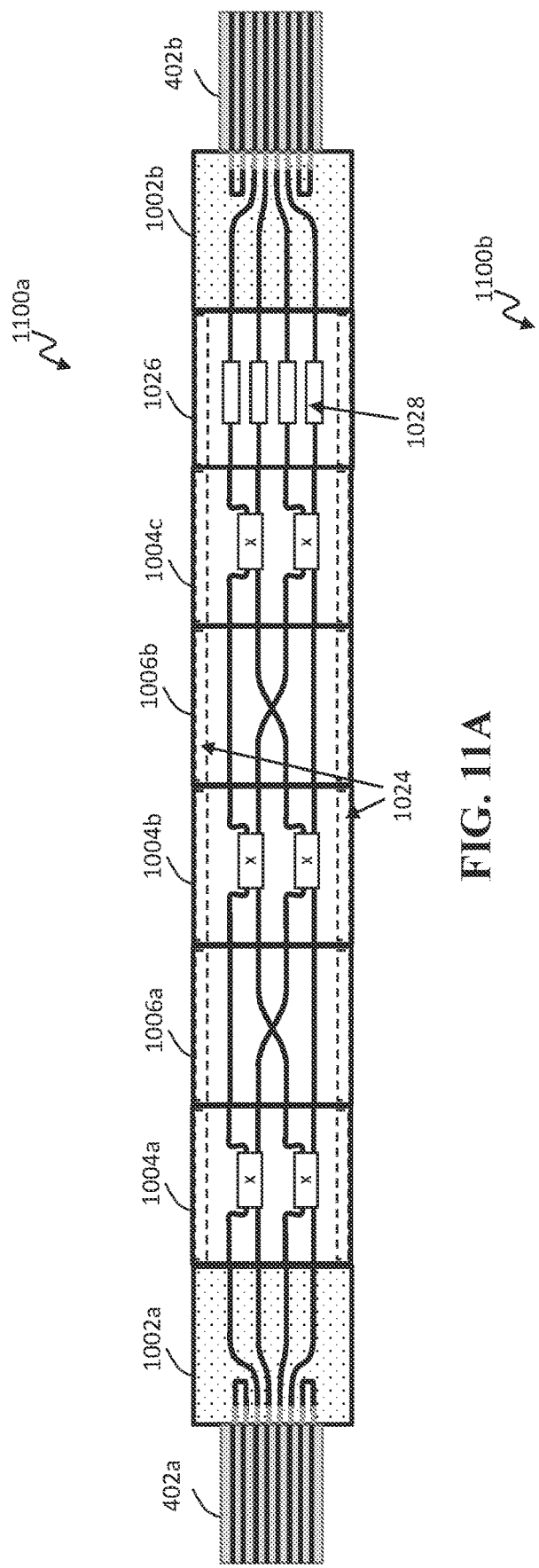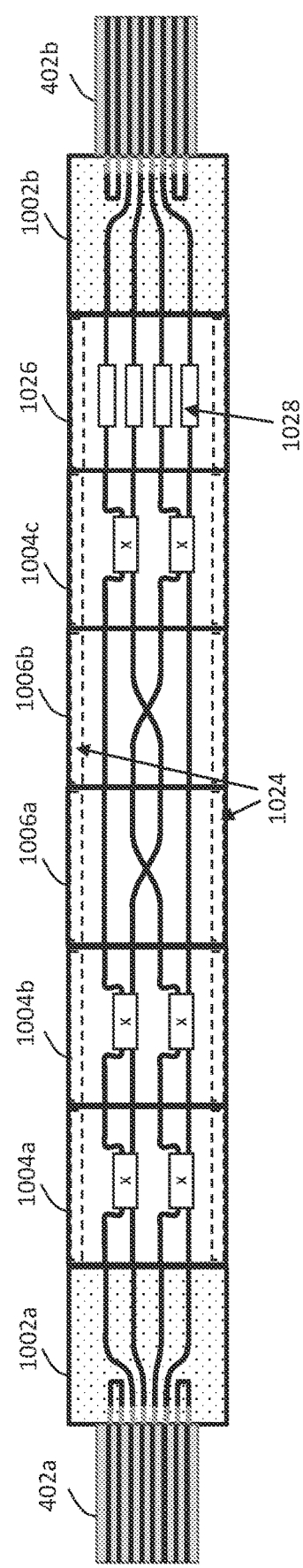
FIG. 11A
FIG. 11B

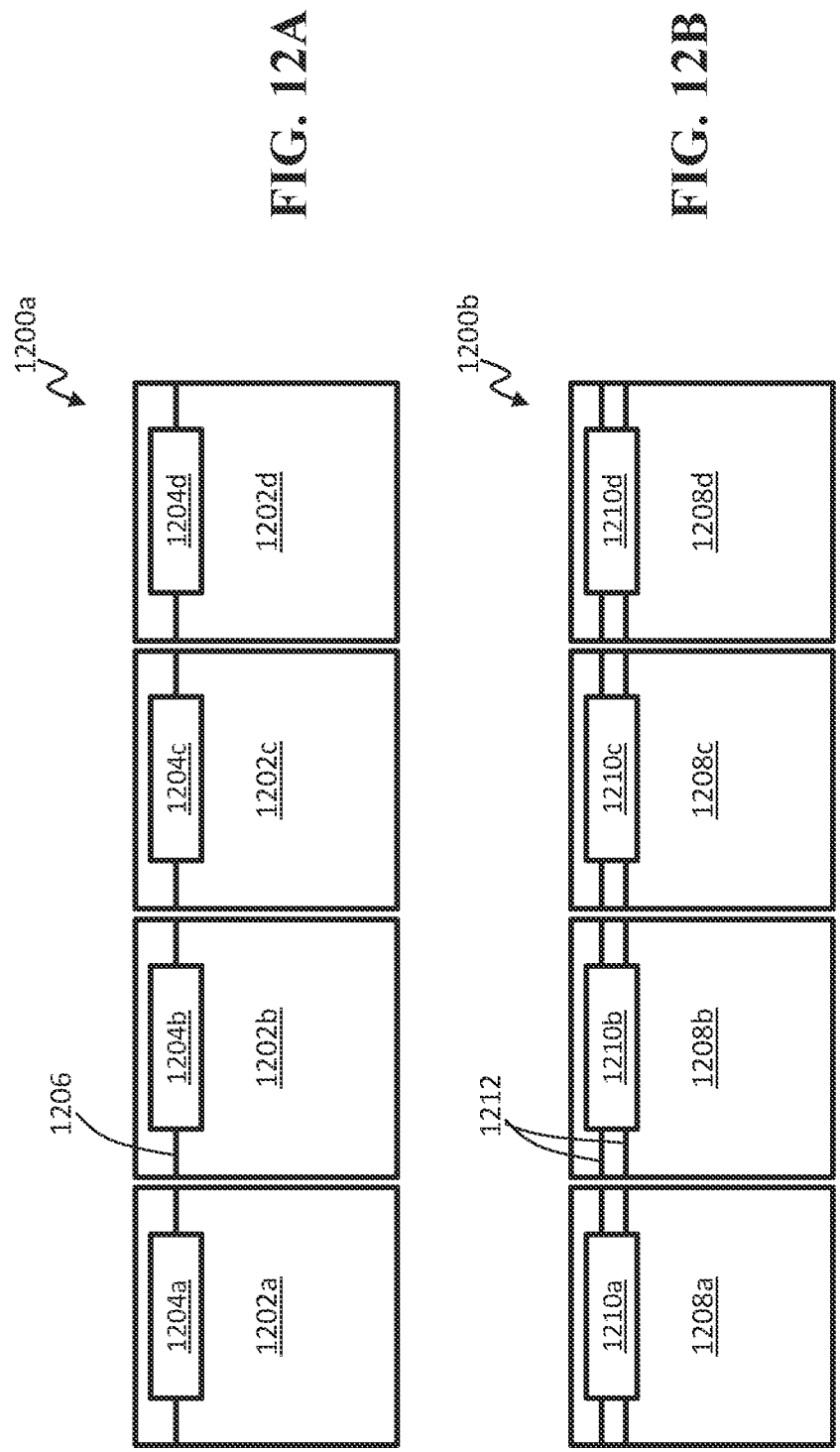

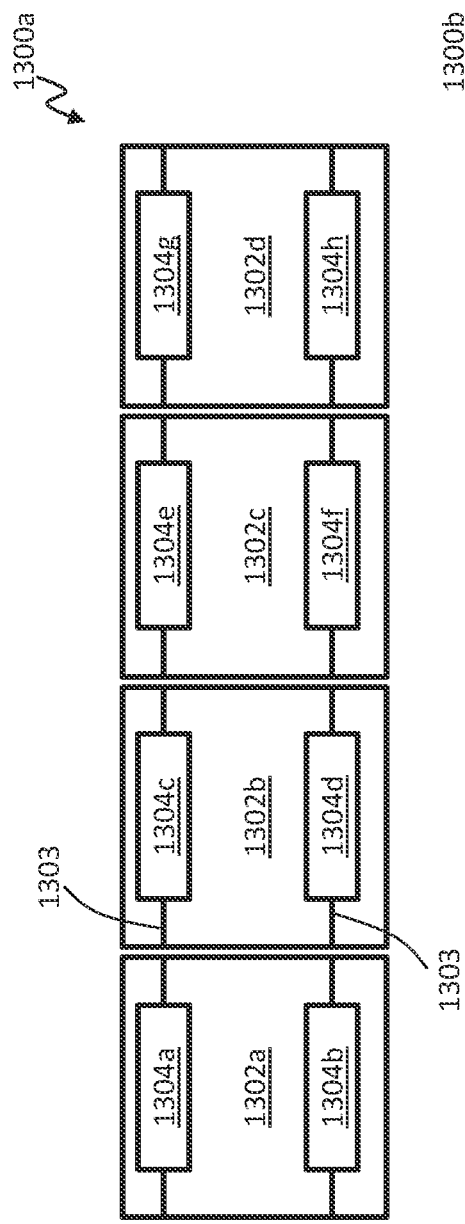
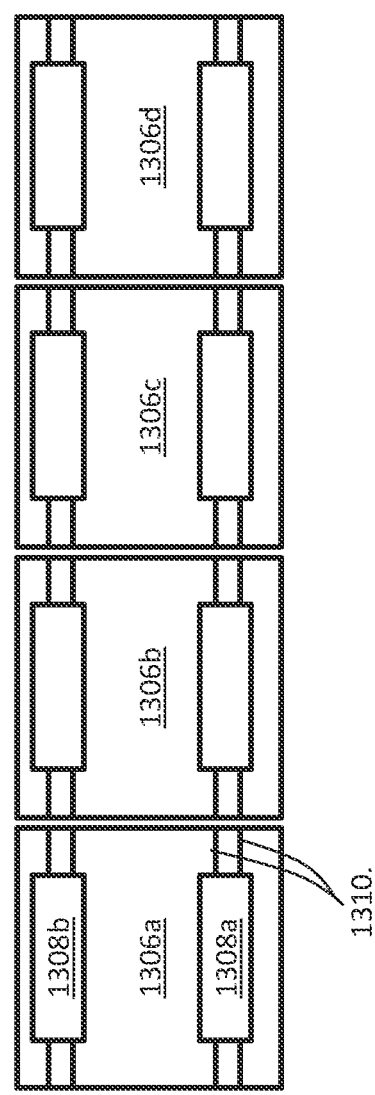

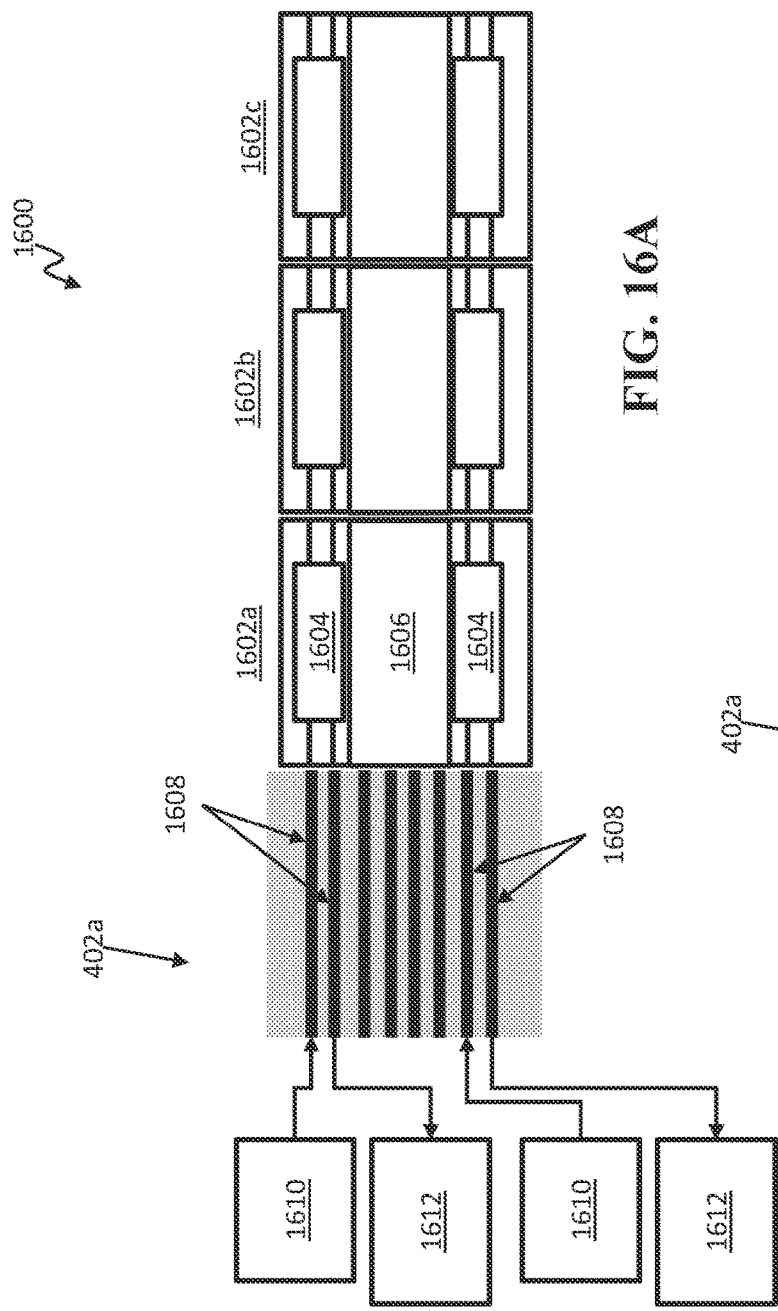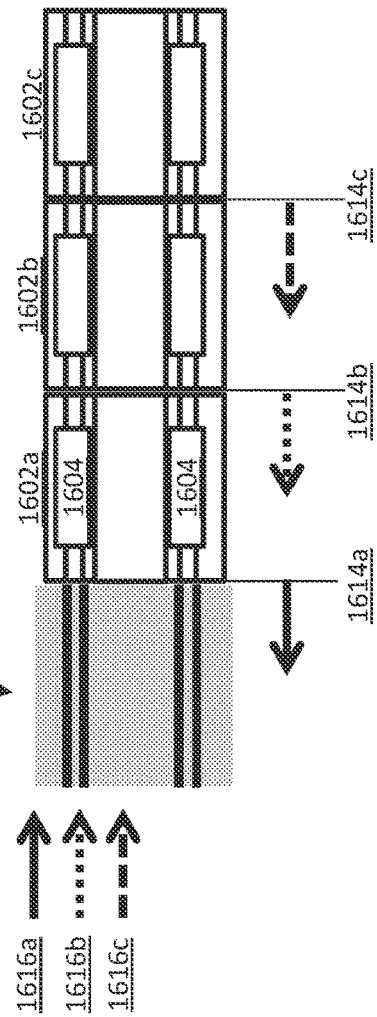

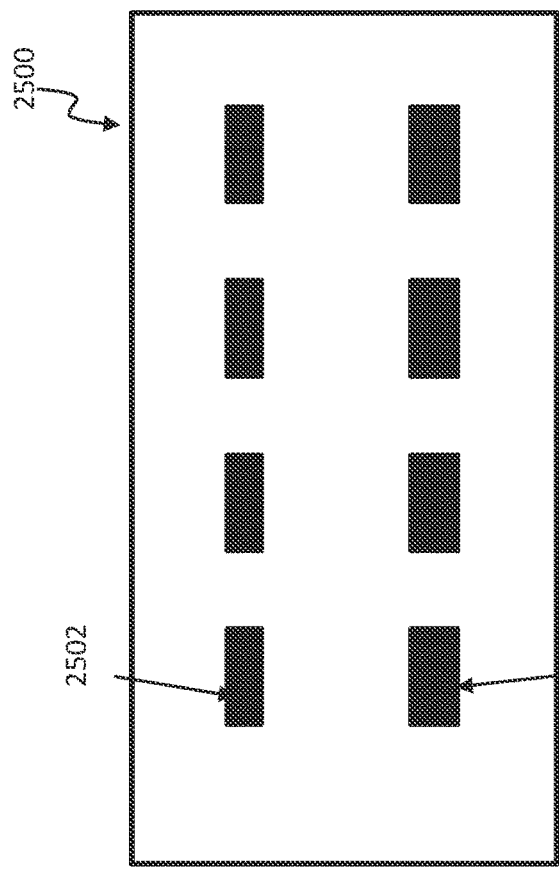 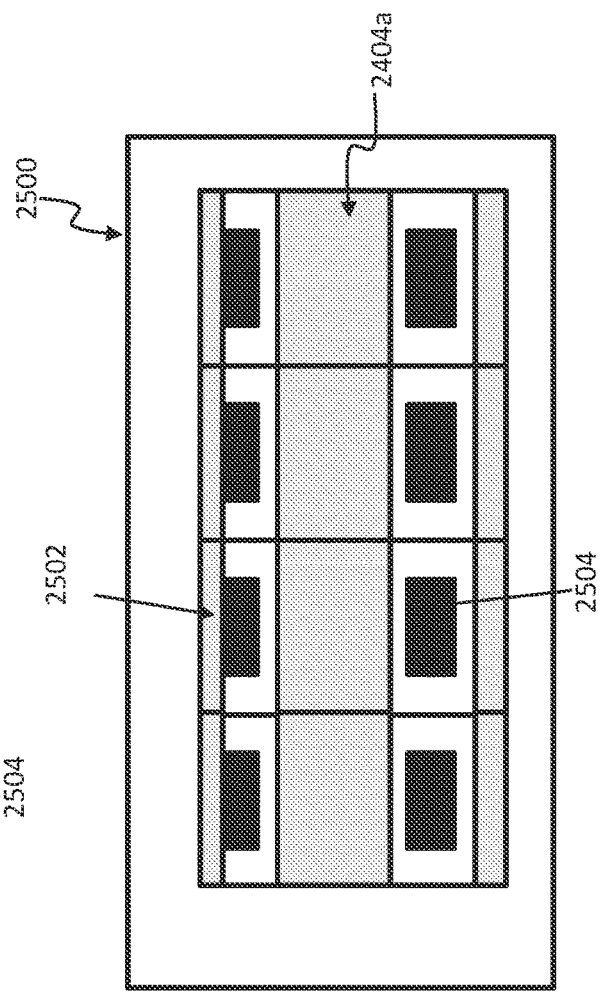
FIG. 25A
FIG. 25B

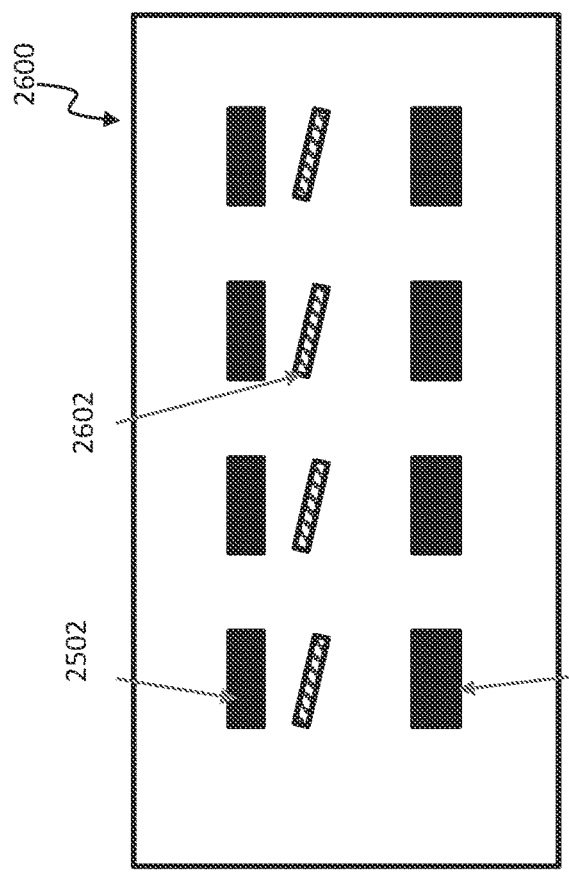
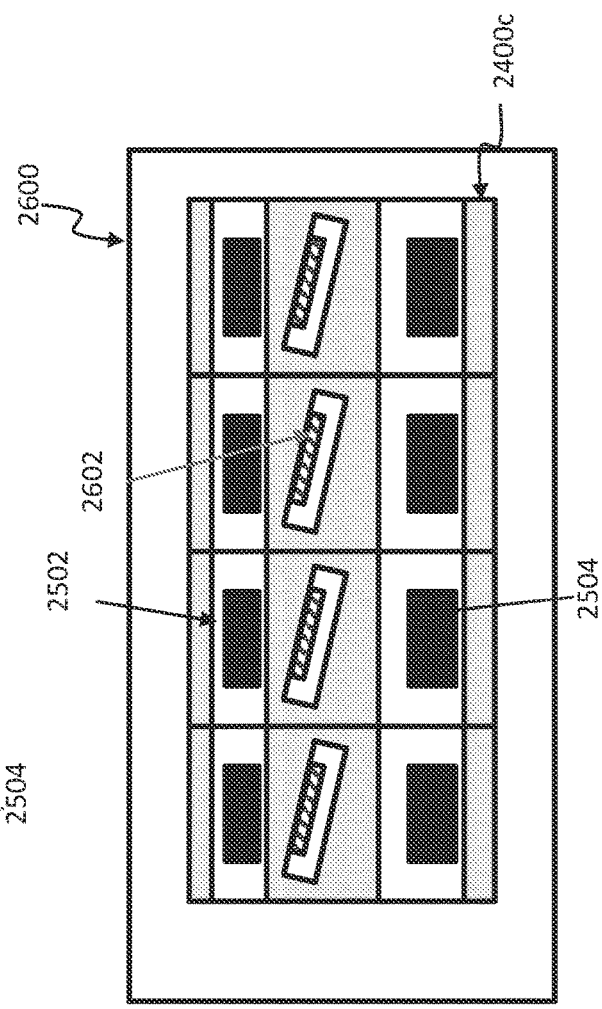
FIG. 26A
FIG. 26B

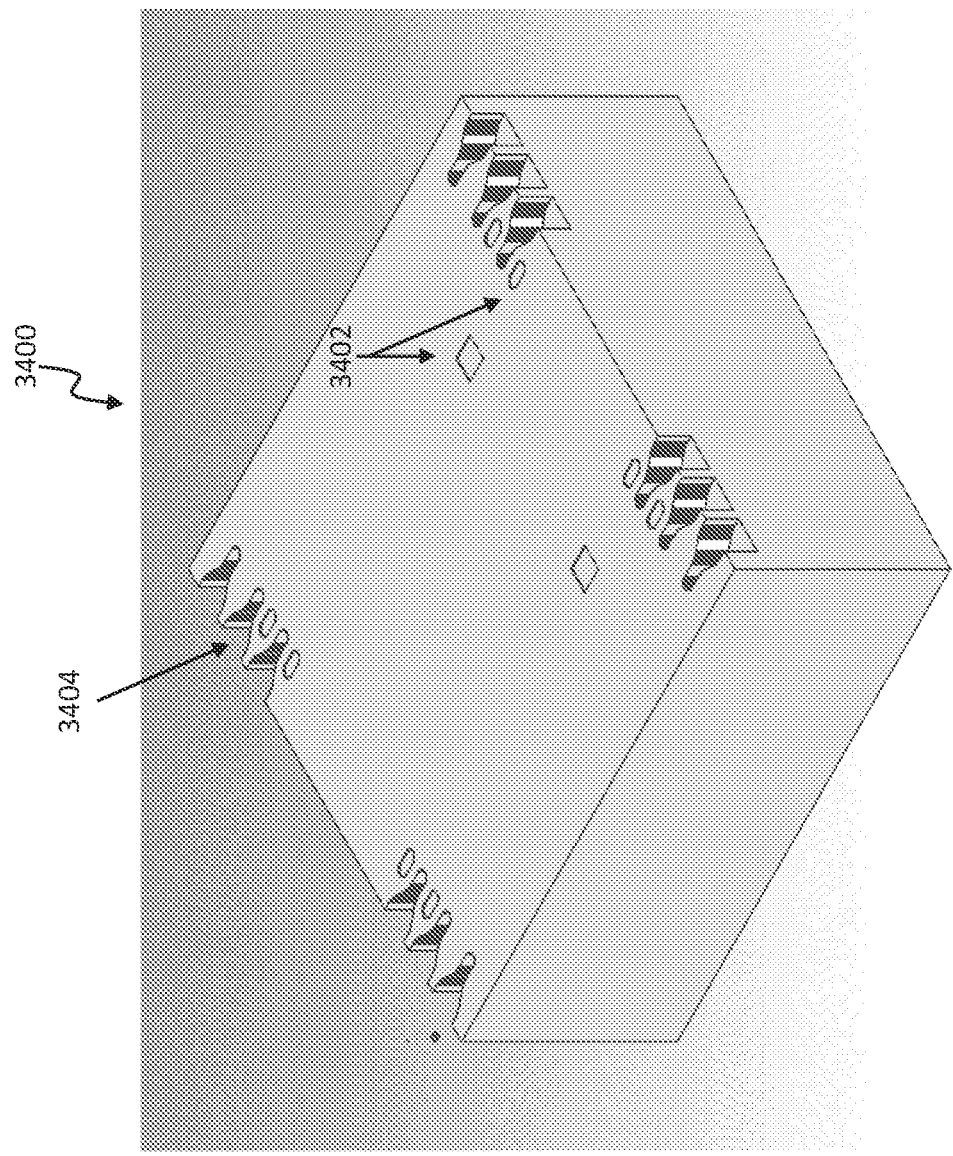

INTEGRATED PHOTONICS ASSEMBLIES

CROSS-REFERENCE TO RELATED APPLICATIONS

This application is a U.S. National Stage of International Application No. PCT/US2021/020033 titled "INTEGRATED PHOTONICS ASSEMBLIES" and filed Feb. 26, 2021 which claims priority to and the benefit of U.S. Provisional Application No. 62/982,545 titled "Integrated Photonics Assembly" and filed Feb. 27, 2020; U.S. Provisional Application No. 63/009,633 titled "Photonic Chiplet Assembly Monitoring" and filed Apr. 14, 2020; and U.S. Provisional Application No. 63/017,864 titled "Modular Photonic Chiplet Assembly Packaging" and filed Apr. 30, 2020, which are incorporated herein by reference in their entireties.

TECHNICAL FIELD

The following disclosure is directed to integrated photonics assemblies and, more specifically, integrated photonics assemblies including modular photonic integrated subcircuits.

BACKGROUND

Photonic integrated circuits (PICs), also referred to as integrated optical circuits or photonics chips, have been employed to miniaturize optical circuits. However, application-specific PICs are mainly fabricated on at wafer-scale using a CMOS design and process flow. The production of such PICs typically requires many months and, in some cases, up to a year or more. Further, chip-to-chip attachment of two photonics chips typically requires an active process using optical feedback among chips. Traditionally, to properly attach one chip to another, all six degrees of freedom—translations in the x, y, and z axes and rotations about those axes (yaw, pitch, and roll)—need to be controlled and optimized. This results in an expensive, time-consuming process that is difficult to scale up,

SUMMARY

In one aspect, the disclosure features a system including a first integrated photonics assembly having a first functionality, in which the first assembly includes a plurality of modular photonic integrated subcircuits. Each subcircuit can be pre-fabricated and can be configured to transfer light to and receive light from another subcircuit based on the first functionality. An output port of a first subset of the subcircuits can be configured to be aligned with an input port of a second subset of the subcircuits. At least one subcircuit can be configured to be removed from the first integrated photonics assembly and connected to a second integrated photonics assembly having a second functionality. The first integrated photonics assembly can be different from the second integrated photonics assembly and the first functionality can be different from the second functionality.

Various embodiments of the system can include one or more of the following features.

Each subcircuit of a subset of the plurality of subcircuits can be configured to be optically coupled to at least two other subcircuits of the plurality of subcircuits. The plurality of subcircuits can be arranged in two-dimensional array such that a first dimension of the array includes at least two subcircuits and a second dimension of the array includes at least two subcircuits. Each subcircuit can have a first length in a first dimension of the subcircuit and a second length in a second dimension of the subcircuit. For the first subset of the subcircuits, the output port can be configured at a particular position along a first edge of the subcircuit. For the second subset of the subcircuits, the input port can be configured at a particular position along a second edge of the subcircuit. The input port and the output port can be optical ports. Light can be transferred from the output port to the input port with a coupling efficiency greater than 90%. A first subcircuit can be disposed relative to a second subcircuit such that at least one of: (a) the first subcircuit is disposed immediately adjacent to and co-planar with the second subcircuit; or (b) the first subcircuit overlaps with the second subcircuit. The system can include an optical fiber configured to carry optical signals between a subcircuit of the plurality of subcircuits and an external device.

At least two subcircuits can be configured to transfer and receive light via butt-coupling. At least one additional subcircuit can be configured to transfer and receive light to one of the at least two subcircuits via at least one of: (i) one or more optical fibers; (ii) one or more photonic wirebonds; (iii) a free-space optical train; (iv) adiabatic coupling; or (v) out-of-plane coupling. At least two subcircuits are configured to transfer and receive light via at least one of: (i) butt-coupling; (ii) one or more optical fibers; (iii) one or more photonic wirebonds; (iv) a free-space optical train; (v) adiabatic coupling; or (vi) out-of-plane coupling.

The system can include a plurality of monitoring circuits. Each monitoring circuit can be coupled to a respective one of a subset of the plurality of subcircuits. Each monitoring circuit can include a first light path between an input and an output of the subcircuit. Each monitoring circuit can be configured to monitor optical loss in the light path. Based on the monitored optical loss, the monitoring circuit can be configured to determine at least one of (i) a coupling efficiency or (ii) a degree of alignment between the respective subcircuit and another subcircuit immediately adjacent to the respective subcircuit. Each monitoring circuit can include a second light path configured to monitor light transferred in an opposite direction from light transferred in the first light path.

The system can include a second plurality of monitoring circuits. Each second monitoring circuit can be coupled to the respective one of the subset of the plurality of subcircuits. Each second monitoring circuit can include a light path between an input and an output of the subcircuit. Each second monitoring circuit can be configured to monitor optical loss in the light path. The system can include a fiber optic array configured to transfer light via an optical path to the monitoring circuit.

The system can include a receptacle configured align at least two subcircuits of the plurality of subcircuits. A surface of the receptacle can include at least one alignment feature, in which the alignment feature configured to effectuate alignment between a first subcircuit and a second-subcircuit of the at least two subcircuits. The alignment feature can effectuates at least one of (a) a lateral alignment, (b) a vertical alignment, or (c) an angular alignment between a first subcircuit and a second-subcircuit of the at least two subcircuits. A surface of each of the at least two subcircuits can form a cavity configured to receive the alignment feature of the receptacle. The cavity can be a deep etch, a V-groove, or an oxide open.

In another aspect, the disclosure features a method for aligning two or more photonic integrated subcircuits. The method can include providing at least two photonic integrated subcircuits. Each subcircuit can be pre-fabricated and is configured to transfer light to and receive light from another subcircuit. An output port of a first subcircuit of the subcircuits can be configured to be aligned with an input port of a second subcircuit of the subcircuits. The method can include providing at least one receptacle configured to align the at least two photonic integrated subcircuits; and positioning the subcircuits onto the receptacle such that the output port of the first subcircuit is aligned with the input port of the second subcircuit.

Various embodiments of the method can include one or more of the following features. The output port of the first subcircuit can be an optical output port and the input port the second subcircuit can be an optical input port. Light can be transferred from the output port to the input port with a coupling efficiency greater than 90%. Each subcircuit can include at least one subcircuit vertical alignment feature and/or at least one subcircuit lateral alignment feature. The receptacle can include at least one receptacle vertical alignment feature and/or at least one receptacle lateral alignment feature. The subcircuit vertical alignment feature can be configured to be complementary to the receptacle vertical alignment feature, and the subcircuit lateral alignment feature can be configured to be complementary to the receptacle lateral alignment feature.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the systems and methods described herein. In the following description, various embodiments are described with reference to the following drawings.

FIGS. 3A-3C are diagrams of top views of example integrated photonics assemblies, which each include multiple subcircuits.

FIG. 10A is a diagram of a top view of an example 1D integrated photonics assembly.

FIGS. 10B-10C are diagrams of top views of a representative subcircuit of the assembly of FIG. 10A.

FIGS. 11A-11B are diagrams of top views of alternative examples of the assembly of FIG. 10A.

FIGS. 12A-12B are diagrams of top views of example assemblies of four integrated photonic subcircuits, in which each subcircuit is configured to transfer light to an adjacent subcircuit.

FIGS. 13A-13B are diagrams of top views of four example integrated photonic subcircuits, in which each subcircuit is configured to transfer light to an adjacent subcircuit.

FIG. 16A is a diagram of a top view of an example 1D integrated photonics assembly including three subcircuits, in which each subcircuit has at least one monitoring circuit and a useful circuit.

FIG. 16B is a diagram of a top view of a simplified representation of FIG. 16A to illustrate an example of wavelength dependence of the interfaces between the subcircuits.

FIG. 25A is a diagram of a top view of an example receptacle configured to receive subcircuits of FIGS. 24A-24D.

FIG. 25B is a diagram of a top view of the receptacle of FIG. 25A connected to four subcircuits of FIG. 24A.

FIG. 26A is a diagram of a top view of an example receptacle configured to receive subcircuit of FIG. 24A.

FIG. 26B is a diagram of a top view of an example receptacle connection to four subcircuits of FIG. 24A.

FIG. 34 is a diagram of a perspective view of an example 3D drawing of a subcircuit having shallow-etched vertical alignment features and deep-etched lateral alignment features.

DETAILED DESCRIPTION

Figure 1:
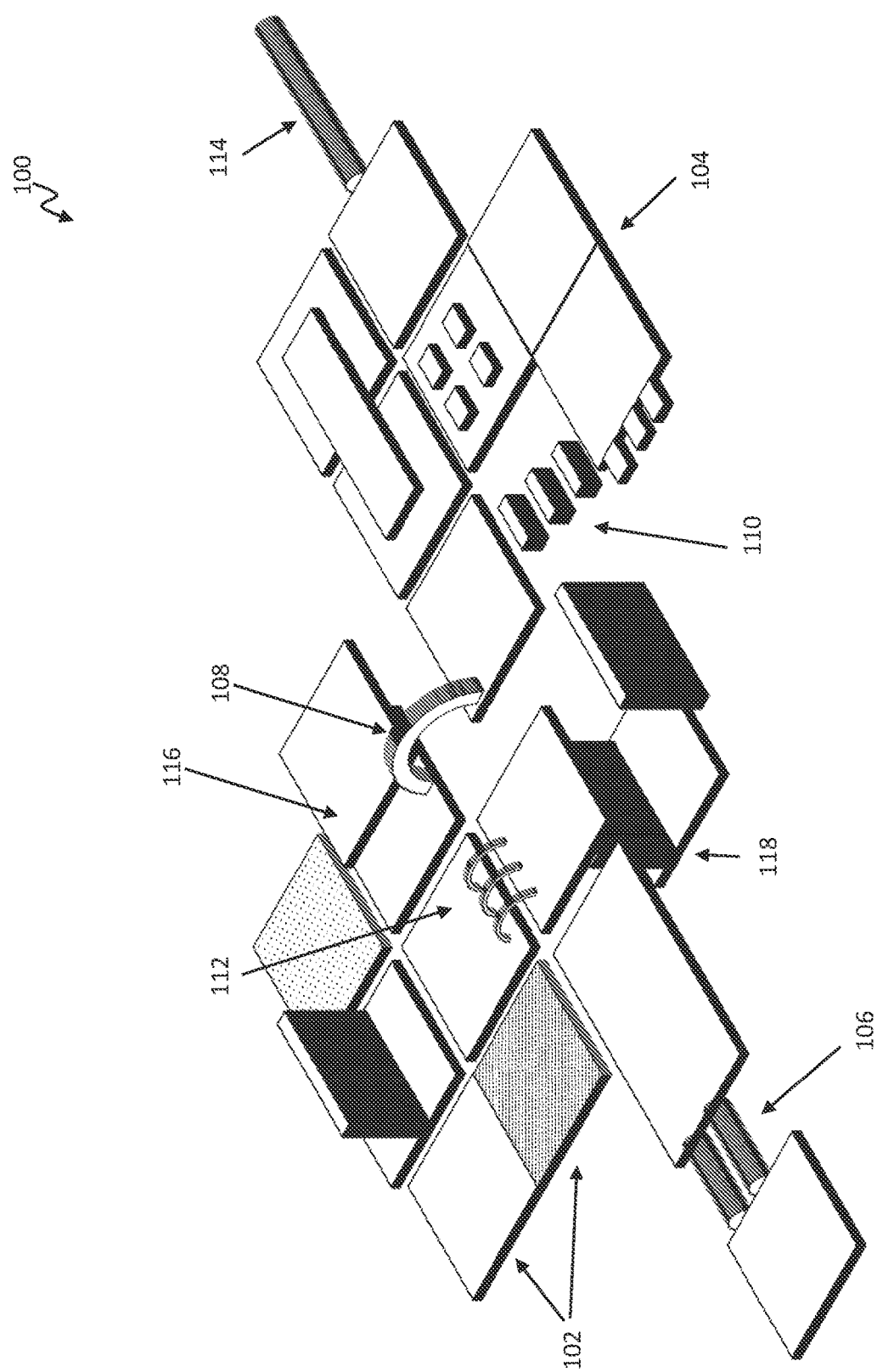
FIG. 1 is a diagram of a perspective view of an example integrated photonics assembly that multiple photonic integrated subcircuits.

Disclosed herein are embodiments of photonic integrated subcircuits that can be assembled into an integrated photonics assembly. These photonic integrated subcircuits may be referred to herein as "subcircuits", "chiplets", or "sub-chips". The integrated photonics assembly may be referred to herein as "an assembly", "an integrated photonics assembly", or "a photonic integrated circuit" (PIC). A given photonic integrated subcircuit can be configured to transfer light to and/or receive light from at least one other subcircuit, for example, using one or more light transfer techniques. In various embodiments, each photonic integrated subcircuit is a discrete integrated circuit or chip that be physically separated from one another, moved, and/or attached to one another. The example subcircuits can be assembled to create a larger integrated photonics circuit using two or more subcircuits. The example subcircuits may be used to extend and/or combine an integrated photonic circuit into a larger integrated photonic circuit. The example subcircuits are configured to guide light via waveguide structures and may contain special functions including, e.g., splitting light, wavelength demultiplexing, photo detection, light generation, light amplification, etc.

Standardization of Photonic Integrated Subcircuits

In various embodiments, each subcircuit is a pre-fabricated integrated circuit. By pre-fabricating the subcircuits, the subcircuits can be standardized so as to enable assembly of two or more subcircuits into a PIC. As discussed further herein, standardization of subcircuits can pertain to one or more properties of the subcircuits, including dimension(s), volume, weight, input(s), output(s), functionality, mechanical feature(s) (e.g., for coupling, alignment, etc.), active alignment feature(s), wirebond pad(s), electrical connection(s), feature(s) that are complementary to a receptacle (including vertical alignment feature(s) and/or lateral alignment features), etc. Standardization can include the configuration of complementary properties or structures of two or more adjacent subcircuits, as described further below. For instance, alignment structures and/or waveguide paths in a first type of subcircuit may be configured to be complementary with respective alignment structures and/or waveguide paths in a second type of subcircuit, such that a subcircuit of a first type can be attached to a subcircuit of a second type, e.g., with low optical loss. Standardization of the subcircuits can enable permutational assembly of the subcircuits into PICs. Further, standardization can enable time-efficient and/or cost-efficient packaging.

Because many different types of integrated photonics assembly can be created from the subcircuits, it is beneficial to standardize the subcircuits. One benefit of standardization is that a subcircuit can be switched or interchanged with another subcircuit, thereby creating a different optical assembly that is a variation of the first assembly. In some cases, subcircuits can be configured such that they enable many optical assemblies that are useful with a minimum number of subcircuits. Further, each subcircuit or type of subcircuit can be configured and/or selected for improved performance, reduced cost, efficient or ease of fabrication, efficient or ease of supply, etc.

Note that there is a nonzero likelihood that certain aspects and/or components (e.g., transistors) of an integrated circuit may fail or render the individual fabricated circuit defective. The resulting integrated circuits of a particular fabricated batch that function correctly is the "yield" of that particular batch. By fabricating (and subsequently testing) the integrated photonics subcircuits individually and/or independently, the non-functioning subcircuits can be eliminated from the supply of subcircuits. Further, it is found that a higher number of functioning subcircuits (of a given type) can be produced using a single type of fabrication process (e.g., on a given wafer). In comparison, a mixed-type integrated circuit (e.g., using more than one type of fabrication process) results in lower yield of that mixed-type integrated circuit. This results in a higher number of fully-functioning integrated subcircuits, thereby contributing to an increased number of integrated photonics assemblies. Therefore, in some cases, it may be preferrable to generate an integrated optical circuit from subcircuits even if all the component subcircuits can be fabricated in the same process. This can increase the number of optical assemblies that can be built. Furthermore, the subcircuits can be yielded before they are used in the optical assembly, thereby increasing the total yield of a certain optical assembly. The optical assembly can thus be yield-optimized by forming the assembly from different sub-chips.

In some embodiments, yields are significantly improved in an integrated photonics assembly as compared to a monolithic chip. In some embodiments, cost is significantly reduced in an integrated photonics assembly as compared to a monolithic chip. As illustrated below, improvements in yield and/or cost may depend on the type of internal component or functionality. The following tables provide two numerical examples comparing the yields of traditional "monolithic" integrated photonic circuits to the yields of the modular integrated photonics assemblies, as described herein. In particular, the left side of Table 1 illustrates a monolithic chip that is fabricated with two wavelength demultiplexers (WDMs) in which each individual WDM typically has a 50% yield. Further, the right side of Table 1 illustrates a modular assembly including two 50%-yield WDMs. As illustrated, even with the cost of assembly, the total cost of the assembly is significantly less (e.g., at least 55% less) than the total cost of a monolithic chip.

TABLE 1

Yield comparison between a monolithic chip and a modular assembly having two 50%-yield WDMs.

| Monolithic Chip having two 50%-yield WDMs | | Modular Assembly having two 50%-yield WDMs | |
| --- | --- | --- | --- |
| Cost | $10 | Cost | $10 |
| Yield | 25% | Yield | 50% |
| True Cost | $40 | True Cost | $20 |
| | | Total Cost = True Cost + Assembly Cost | $22 |

Another illustration of the yield difference and cost is provided in Table 2 below. Both yield and cost are dramatically improved for the modular assembly over the monolithic chip. Refer to FIG. 10A for an example of an integrated photonics assembly 1000 including a subcircuit 1008 having Ge photodetectors (PDs).

TABLE 2

Yield comparison between a monolithic chip and a modular assembly having two 90%-yield PDs.

| Monolithic Chip having 100 98%-yield Ge PDs | | Modular Assembly having 100 98%-yield Ge PDs | |
|---|---|---|---|
| Cost | $20 | Cost | $20 |
| Yield | 13% | Yield | 81.7% |
| True Cost | $154 | True Cost | $25 |
|  |  | Total Cost = True Cost + Assembly Cost | $27 |

In some embodiments, subcircuits are standardized in size. For example, a standardized set of subcircuits may include subcircuits that are each 1 mm in width and 1 mm in length. In some cases, the standardized set may include two or more subsets of subcircuits in which the size of subcircuits in each subset is standardized. For example, a first subset may have subcircuits of 1 mm×1 mm, a second subset of subcircuits of 1 mm×2 mm, a third subset of subcircuits of 2 mm×2 mm, a fourth subset of subcircuits 1 mm×3 mm, etc.

In some embodiments, the subcircuits are standardized according to the light port positioning and/or electrical pad positioning. For instance, the position of light input ports and/or output ports along the edges or surface of the subcircuits may be standardized for groups of subcircuits. By leveraging standardization, a library of standard subcircuits can be produced to build nearly an endless variety of photonic assemblies without the need for costly or time-consuming customization of the package or assembly process.

In some embodiments, the standardization of subcircuits contributes to and/or directly beget the standardization of other components, e.g., printed circuit boards (PCBs), non-optical components, lasers, etc. For example, by standardizing the electrical pads in a subcircuit, connecting pads on a host PCB can also be standardized, thereby contributing greater efficiency.

Modularity of Photonic Integrated Subcircuits

Importantly, each subcircuit is configured to be a modular component of an integrated photonics assembly. The modular character of the subcircuits is one benefit of the standardization of the subcircuits. For instance, two or more subcircuits, e.g., subcircuits $S_1$ and $S_2$, can be assembled into assembly A with functionality $F_A$. One or more of these subcircuits (e.g., subcircuit $S_2$) can be removed from assembly A and connected to another subcircuit (e.g., subcircuit $S_3$) and/or an assembly to form assembly B, in which assembly B has a functionality $F_B$ (which may be different from functionality $F_A$). In doing so, the modular character of the subcircuits enable many useful integrated optical assemblies.

Various benefits flow from the modularity of the photonic integrated subcircuits. In particular, the modularity of the subcircuits facilitate the scaling (e.g., scaling up or down) of integrated photonics assemblies, replacement of subcircuits of an assembly, improvements to existing PICs, reconfigurability of assemblies, etc. Importantly, the described systems and methods can produce the desired subcircuits and/or customized integrated photonics assemblies faster than the fabrication of a conventional PIC. For example, a customized integrated photonics assembly may be produced within seven (7) days as compared to the one (1) year required for the conventional PIC. Accordingly, the described systems and methods enable efficiencies in time and/or cost.

Further, the modular subcircuits can reduce waste. For example, as described below, the described systems and methods permit the reuse of existing subcircuits and/or reconfiguring of existing assemblies. In another example, the described techniques enable the fabrication of subcircuits on demand (and therefore a reduction of inventory).

In some embodiments, in a given assembly, a particular subcircuit S is discovered to be faulty (e.g., inefficient, inoperable, incompatible, etc.). That particular subcircuit S may be removed from the assembly and a replacement subcircuit S' may be installed in its place. In another example, the particular subcircuit S may need to reconfigured and/or translated to another portion of the assembly to be operable. This has the advantage of avoiding disturbing the rest of the assembly while providing a quick and/or simple solution to replacing a faulty part of the assembly. By contrast, a conventional PIC—which requires a single indivisible "chip"—may not be repairable by swapping out or reconfiguring of a fault component.

In another embodiment, the modularity of the subcircuits facilitate the evolution of engineering and/or design of integrated photonics assemblies over time. The development of an assembly A having a particular functionality may change from a first generation (e.g., assembly $A_1$) configuration to a second generation (assembly $A_2$), third generation (assembly $A_3$), and so on to accommodate needs of customers and/or adapt to changing markets, new technologies, different materials, different standards, a change in specifications, evolving regulation, etc. This may be achieved by adding, replacing, moving, reconfiguring, etc. one or more subcircuits in the assembly (e.g., assembly $A_1$) to produce another assembly (e.g., assembly $A_3$). For example, at some time after the production of the first generation assembly $A_1$, a new subcircuit may become available. This new subcircuit may be added to or replace an existing subcircuit in the first generation assembly $A_1$ to form the second generation assembly $A_2$.

In another embodiment, an existing assembly A may be repurposed or adapted with a different functionality by changing one or more subcircuits included in the assembly A. In another example, a conventional PIC may be repurposed or reconfigured with a different functionality by adding one or more subcircuits to the PIC. In such a case, an adapter-type subcircuit may be coupled to the conventional PIC and one or more subcircuits may be coupled to the adapter-type subcircuit. In another embodiment, two or more assemblies may be coupled together by one or more subcircuits, e.g., forming a light path between the two or more assemblies.

One primary characteristic of an integrated photonics chip (or subchip) is its ability to guide light. In various embodiments, the subcircuits can be fabricated from one or more electro-optic crystals, polymers, and/or semiconductor materials. For example, this can be achieved in a CMOS-compatible sub-chip or so-called silicon photonics, silicon-on-silica, silicon nitride, aluminum oxide, glass, III/V based integrated photonics chips, lithium niobate, silicon-on-insulator, gallium arsenide (GaAs), indium phosphide (InP), nitride, glass, etc. In some embodiments, the subcircuit is a combination of subcircuits. For example, a silicon photonics subcircuit can be enhanced with a III/V chip to increase its functionality (e.g., optical detection and optical gain), thereby creating a subcircuit that includes two or more chips or subchips.

The example integrated photonics assemblies may be configured for one or more functionalities. The assemblies may be configured for communication, biomedical, chemical, research, computing, or other applications. A non-limiting list of applications include beamforming, beam-steering, LiDAR, biomedical instrumentation (OCT, spectrometers, diagnostics, etc.), biophotonics (blood analysis, brain control, etc.), acousto-optics, astrophotonics, gyroscopes, metrology, optical clocks, magneto-optics (integrated magneto-optical devices, isolators, memory, switches, etc.), artificial intelligence, reconfigurable photonic processors, THz photonics, microwave photonics, fiber sensor interrogators, free-space optical communication (Li-Fi, satellite Internet, etc.), augmented reality, quantum optics (QKD, QRNG, etc.), etc.

Light Transfer Techniques

Light may be transferred and/or received between two or more subcircuits using one or more light transfer methods, as described in further detail below. Each subcircuit can transfer light to at least one other subcircuit. In some cases, electrical signals, microwave signals, and/or fluids may be transferred and/or received by the subcircuits. In various embodiments, the wavelength of the light can span from 100 nm to 20 microns. Light can be transferred and/or received over one or more channels. In some embodiments, a given channel transmits light in one or more wavelengths, one or more polarizations, and/or one or more modes.

In various embodiments, a subcircuit can be as close as zero (0) micron distance edge-to edge with another subcircuit. This can be true when two or more subcircuits are stacked horizontally, stacked vertically, or configured to be partially overlapping (e.g., negative distance edge to edge). In various embodiments, the maximum distance between light-transferring subcircuits can be as large as 10 cm. In some embodiments, the distance is between is 0 um and 2 mm.

In various embodiments, an integrated photonics assembly can include two or more photonic integrated subcircuits. FIG. 1 illustrates an example integrated photonics assembly 100 that includes multiple subcircuits 102. As depicted, the subcircuits 102 can be coupled to one another by one or more techniques. For example, light can be transferring between two or more subcircuits via butt-coupling 104, optical fiber(s) 106, photonic wirebond(s) 108, a free-space optical train 110, electrical wirebonds 112, adiabatic coupling, out-of-plane coupling, etc. In various embodiments, the integrated photonics assembly 100 can be optically connected to an external system (e.g., a subcircuit, another assembly, a conventional PIC, an electrical system, a computing system, a biomedical system, etc.) by an optical fiber 114. In various embodiments, a channel between two subcircuits can transfer light of one or more polarizations, one or more modes, and/or one or more wavelengths.

The example subcircuits may be arranged in various configurations, e.g., side by side, overlapping, etc. For example, one or more subcircuits can be connected on top of, under, or to the side of a host subcircuit. In some embodiments, a host-type subcircuit is larger in at least one dimension than at least one other type of subcircuit so as to provide sufficient space to "carry" a number of subcircuits. In some embodiments, a host-type subcircuits is smaller in at least one dimension than at least one other type of subcircuit so as to act as a "bridge" between two or more subcircuits. Note that, in the drawings, some subcircuits are distinguished by different patterned or colored surfaces to indicate different types or functionalities.

Light transfer can be accomplished by any one or more of the following techniques. In some embodiments, light is transferred by edge-to-edge coupling (also referred to as butt-coupling) between two or more subcircuits (refer to arrow 104). In this technique, light abruptly exits the subcircuit (e.g. via the end of a light path, waveguide, from an output port, etc.) from one side or edge of the subcircuit into air or any other bulk medium. Light can enter abruptly into the side or edge (e.g., via the beginning of a light path, waveguide, into an input port, etc.) of another subcircuit.

In some embodiments, light is adiabatically transferred between subcircuits by a taper system or method. In this technique, two subcircuits are configured to overlap at least partially (refer to arrow 116). In at least one of the subcircuits, the geometry of a waveguide can be configured such that light can be transferred adiabatically or near-adiabatically to another subcircuit.

In some embodiments, light is transferred between subcircuits via an optical guiding medium. Such optical guiding mediums can include an optical fiber 106, a polymer waveguide, a polymer fiber, etc. The light may be guided in the region or space between the subcircuits and may therefore bridge a larger distance with lower optical loss (as compared two subcircuits without the optical guiding medium). In some embodiments, light is transferred in free-space or in a medium via a crossing lens, a collimator, etc.

In some embodiments, light is configured to exit a subcircuit non-horizontally (e.g., near-vertically or vertically) and enter non-horizontally into another subcircuit. In one example, integrated mirrors or grating couplers can be used to accomplish this type of light transfer. In some embodiments, light exits one subcircuit non-horizontally and enter another subcircuit horizontally. In one example, this is achieved by a subcircuit standing vertically on the surface of another sub-chip (illustrated by arrow 118).

The transfer of light between two or more subcircuits can involve any one or combination of the above-described light transfer methods. In some cases, light transfer can two or more methods (or combinations of methods) for two or more respective channels. Using two or more methods of transferring light can be particularly useful in some cases. In one scenario, butt-coupling of subcircuits may be preferred but a particular routing or direction of the light transfer path may be difficult or may require customization. Such a routing can be achieved by using a flexible connection, e.g., a polymer waveguide or a photonic wirebond. In some instances, some subchips may not be identically sized or shaped due to imperfect dicing or cleaving. Therefore, gaps between such subchips can be spanned using a flexible interconnection method.

Figure 2:
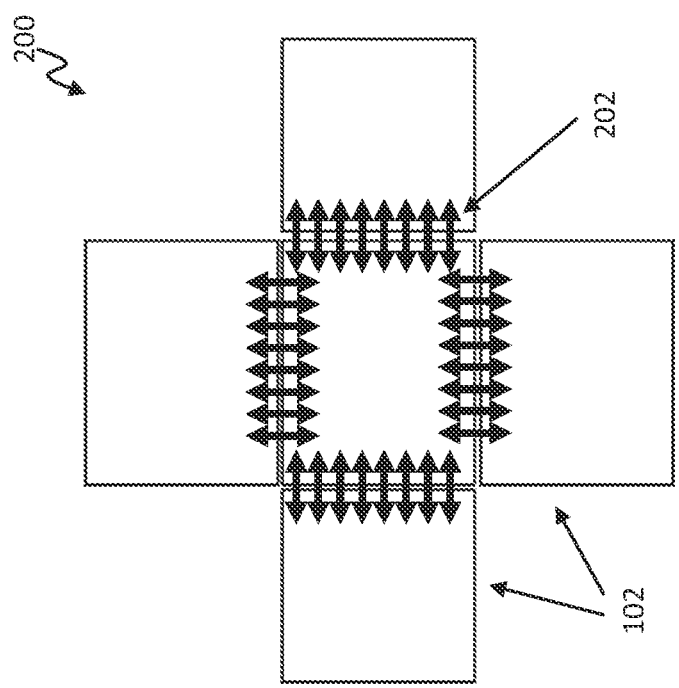
FIG. 2 is a diagram of a top view illustrating light transfer between example subcircuits of an integrated photonics assembly.

In some embodiments, transfer of light between subcircuits is multi-channel. One benefit of subcircuits that are closely spaced is that many light transfers can happen between the two subcircuits at the same time. As an example, a single subcircuits can transfer light to 10 or more other subcircuits with 100 light channels between each sub-chip. Other free-space components may be added in between the subcircuits and in between the optical path(s). FIG. 2 illustrates light transfer between subcircuits of assembly 200. The assembly 200 includes five (5) subcircuits 102, among which light is transferred and/or received.

In the illustrated example, the subcircuits are butt-coupled, thereby making a large number of light transfer paths 202 feasible.

In some embodiments, some chips do not transmit light to a subcircuit and therefore be referred to as "non-photonic subcircuits" or "non-photonic subchips". For instance, such non-photonic subchips may only transmit and/or receive electrical signals from a photonic assembly of subcircuits. Accordingly, these may not be considered a part of the integrated photonics assembly. However, in some embodiments, these non-photonic subchips are part of a standardized package around the integrated photonics assembly.

In various embodiments, light can be transmitted from the integrated photonics assembly to an external or remote device or system. In some cases, this light may eventually reach other optical chips, though these other chips may not be considered part of the optical assembly. Subcircuits may have light paths to an external system by, for example, a fiber, fiber array or free-space connection. There is no lower bound or upper bound on the number of subcircuits that need to be connected from the assembly to outside world (e.g., an external system or device) and no limitation on which method is used.

Integrated Photonics Assemblies

As described above, subcircuits can be combined in many different assemblies and configurations. Subcircuits may be combined in a one-dimensional, two-dimensional, or three-dimensional assembly using any one or more of the techniques described herein.

FIGS. 3A-3C provide examples of integrated photonics assemblies, which each include multiple subcircuits 102. In particular, FIGS. 3A-3C illustrate the modularity properties of the subcircuits, including how the subcircuits can be arranged (e.g., coupled, connected, stacked, etc.) and how the photonics assembly can be standardized. Note that, in these examples, the subcircuits are configured to be the same size (in at least two dimensions) and shape.

FIG. 3A illustrates a one-dimensional (1D) array 300a (also referred to as 1D-stacking). In this case, light can be transferred left or right (indicated by arrow 302 and may be referred to as west or east) between at least a subset of the subcircuits 102. The array 300a may begin with a subcircuit 304a and/or end with a subcircuit 304b. In some cases, subcircuits 304a and/or 304b may be able to transfer light to one other subcircuit and/or from one edge of the subcircuit. To enable efficient light transfer between two or more subcircuits 102, the position of the light path within the subcircuits can be standardized to increase assembly permutations, as discussed in more detail herein.

FIG. 3B illustrates an example two-dimensional (2D) array 300b of subcircuits, which includes subcircuits configured with light transfer paths oriented up and down (indicated by arrow 306 and referred to as north and south). FIG. 3C illustrates an example "pseudo" 2D array 300c, which can be considered an extension of the 1D array. The example array 300c enables multiple parallel circuits to be connected together without requiring north and south light transfer capability on most subcircuits.

Figure 4:
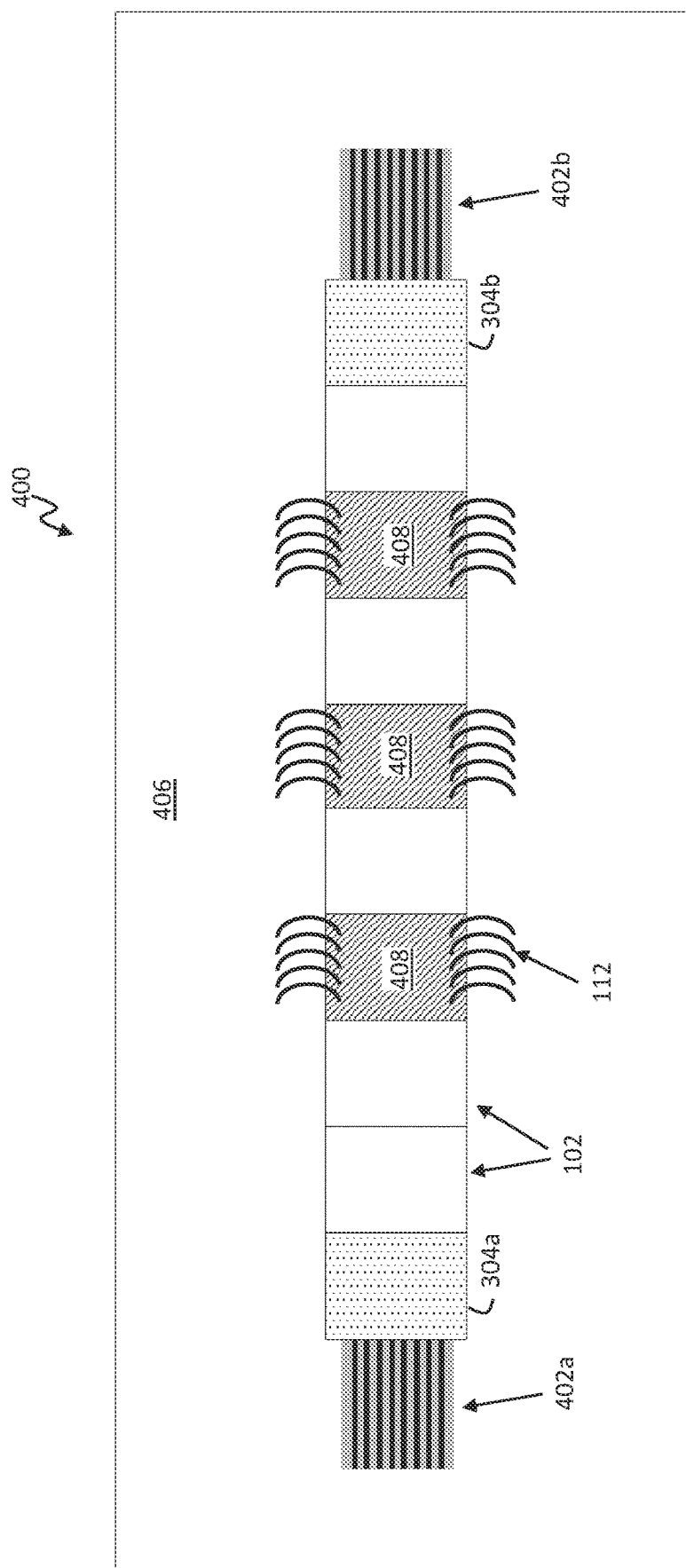
FIG. 4 is a diagram of a top view of an example packaged 1D integrated photonics assembly.

FIG. 4 illustrates an example of a packaged 1D integrated photonics assembly 400. The assembly 400 includes multiple subcircuits 102, a first fiber array 402a connected to the first subcircuit 304a, and a second fiber array 402b connected to the last subcircuit 304b. Note that a subset of the subcircuits are wirebonded via electrical conductors 112 to the printed circuit board (PCB) 406. Wirebonds 112 can be created during the fabrication and/or assembly process. The electrical wirebonds 112 may be standardized such that they can be connected to a particular type of subcircuit 408. Such subcircuits 408 may be configured to handle both light and electrical current.

Figure 5:
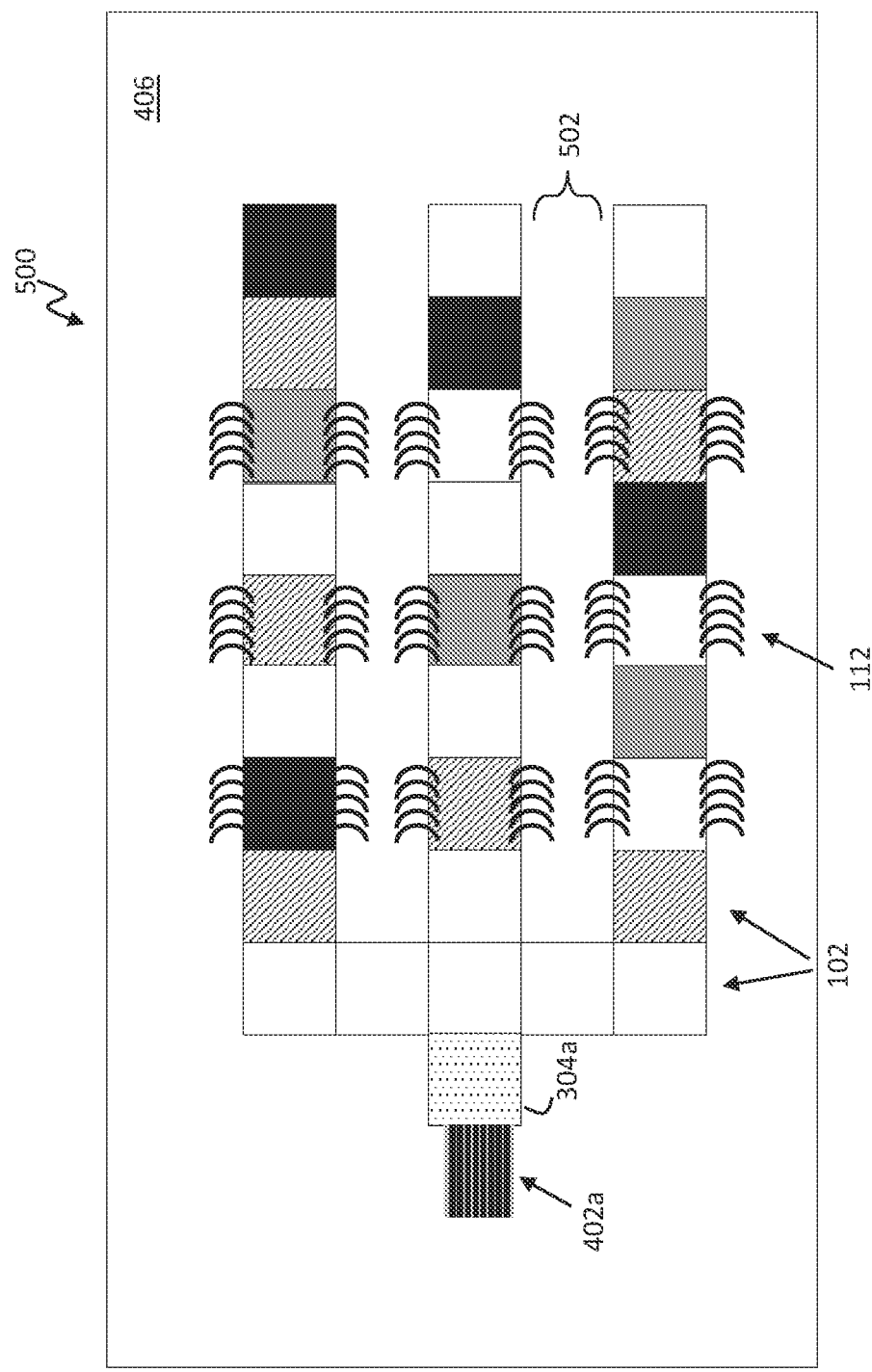
FIG. 5 is a diagram of a top view of an example packaged pseudo-2D integrated photonics assembly.

FIG. 5 shows an example of a packaged pseudo-2D integrated photonics assembly 500. A fiber array 402a is connected to the first subcircuit 304a. In this example, because there are empty spaces 502 between parallel rows of subcircuits, the subcircuits are accessibly wirebonded via wirebonds 404 to the PCB 406. Note that the empty spaces 502 can contribute to the standardization of the host PCB by providing space for electrical pads on the PCB via the empty spaces 502.

Figure 6:
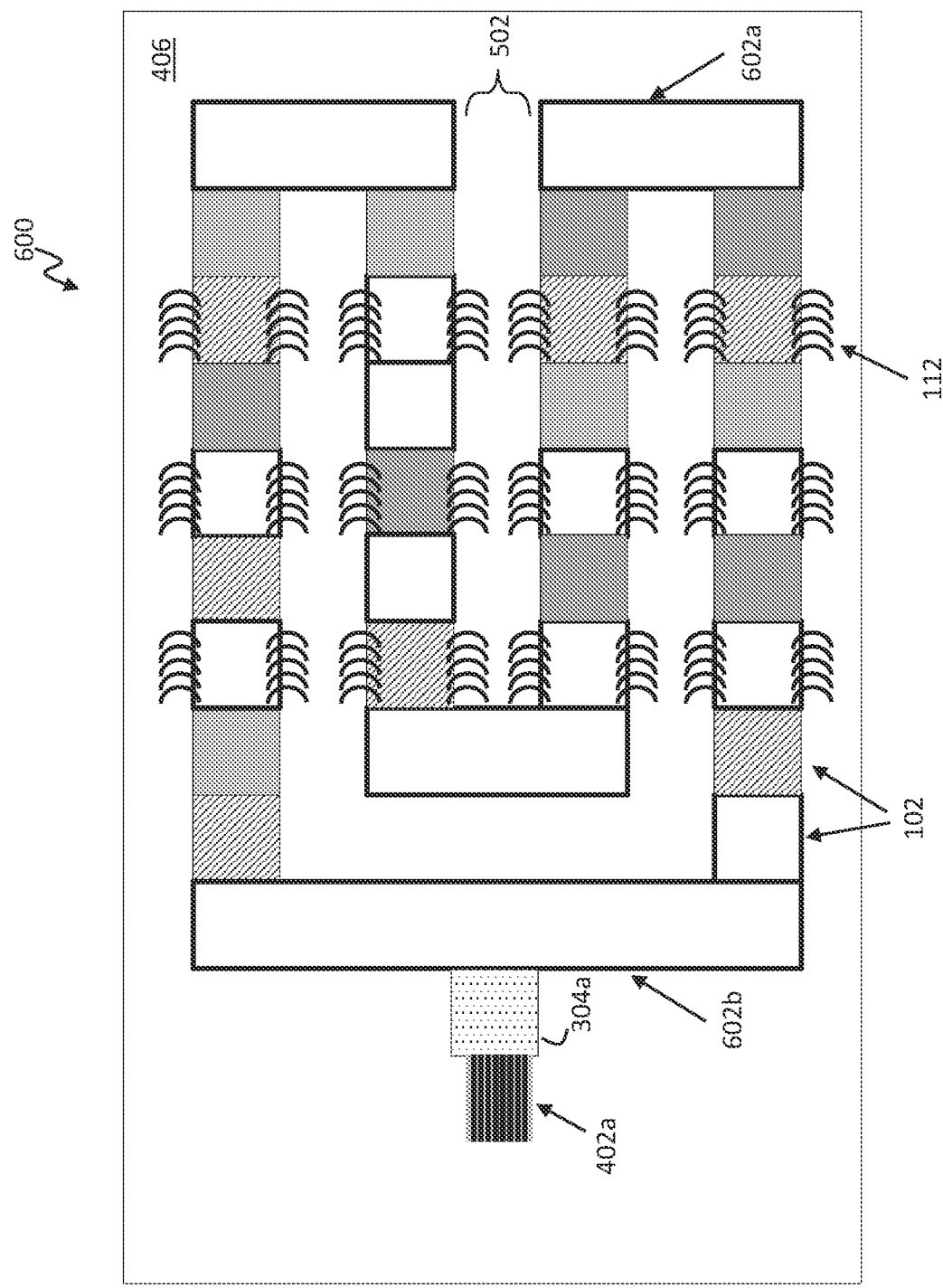
FIG. 6 is a diagram of a top view of an example packaged integrated photonics assembly formed in the shape of a closed-loop "snake".

FIG. 6 shows an example of a packaged integrated photonics assembly 600 which is formed in the shape of a closed-loop "snake". In other words, subcircuits can be connected to one another to form a snake shape. This type of assembly 600 may utilize at least two types of subcircuits, including some subcircuits 102 that connect left or right and some larger subcircuits 602a, 602b (collectively referred to as 602) that are larger than subcircuits 102. If the area of subcircuit 102 is taken as a single unit of measurement, larger subcircuits 602 may have an area equal to two units, three units (e.g., subcircuit 602a), four units, five units, six units, seven units (e.g., subcircuit 602b), and so on. In some embodiments, the larger subcircuits 602 have one or more dimensions that are 1.1 times, 1.2 times, 1.3 times, etc. the corresponding dimension of subcircuit 102. This type of assembly 600 can be beneficial when numerous subcircuits need to be cascaded, the footprint needs to be reduced, and/or occasional connections (e.g., via photonic wirebonds) need to be made. For example, cascading the subcircuits may be advantageous in some implementations and can include connecting one subcircuit to another in loops (instead of one long linear assembly) to reduce the overall footprint of the integrated photonics assembly. The empty spaces 502 between subcircuits 102 allow for ease of electrical wirebonding 112 to the underlying PCB 406.

Figure 7:
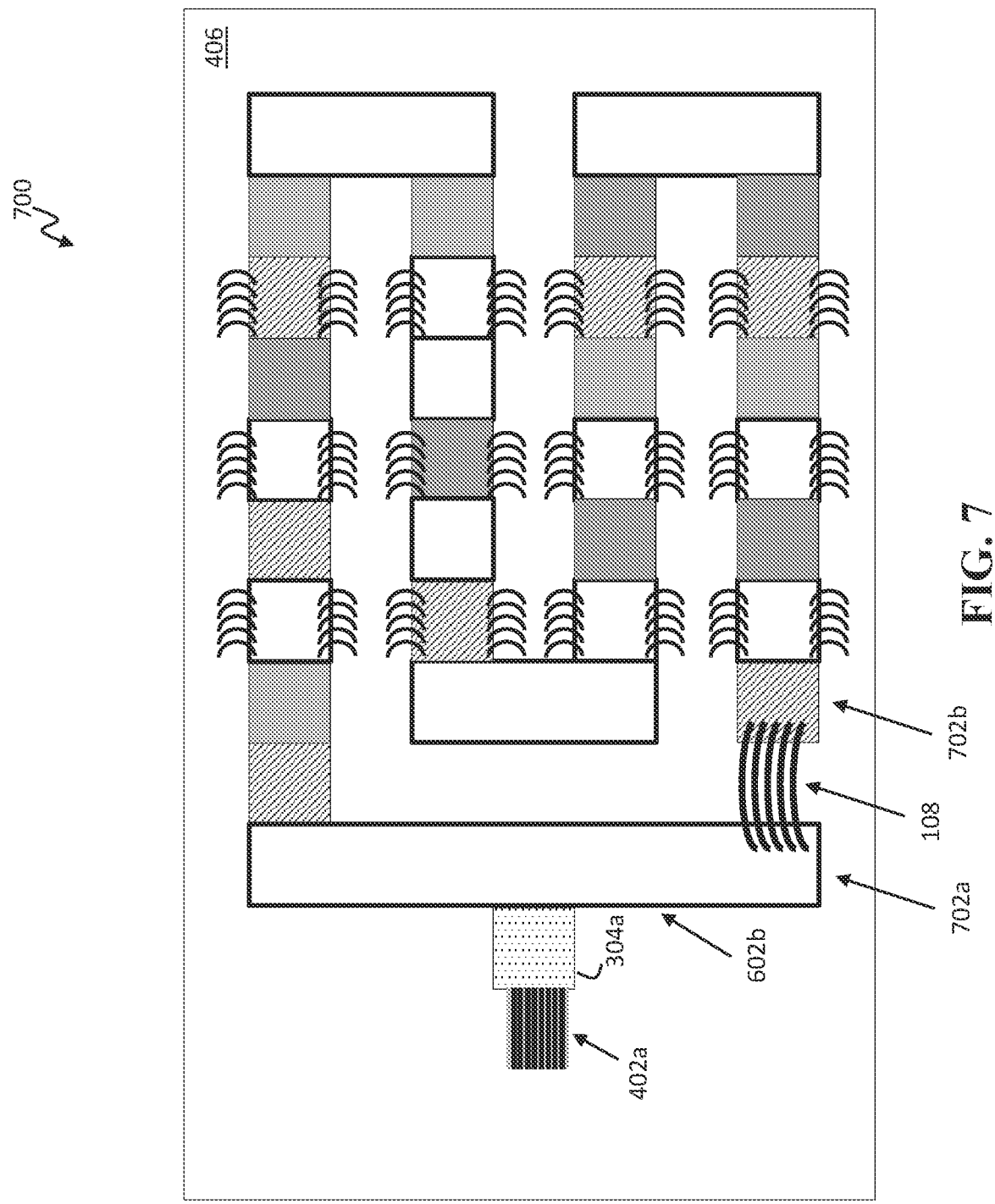
FIG. 7 is a diagram of a top view of an example packaged integrated photonics assembly formed in the shape of an open-loop "snake".

FIG. 7 shows an example of a packaged integrated photonics assembly 700 which is formed in the shape of an open-loop "snake". This type of assembly 700 can be useful when subcircuits vary slightly in size, leading to a mismatch in size in at least one portion of the assembly 700. This can occur, for example, when the subcircuits are diced during fabrication. Accordingly, a subcircuit connection (e.g., the last connection) can be performed using one or more photonic wirebonds 108 to connect the light paths between subcircuit 702a and subcircuit 702b. This can be used instead of coupling techniques, e.g., butt-coupling.

Figure 8:
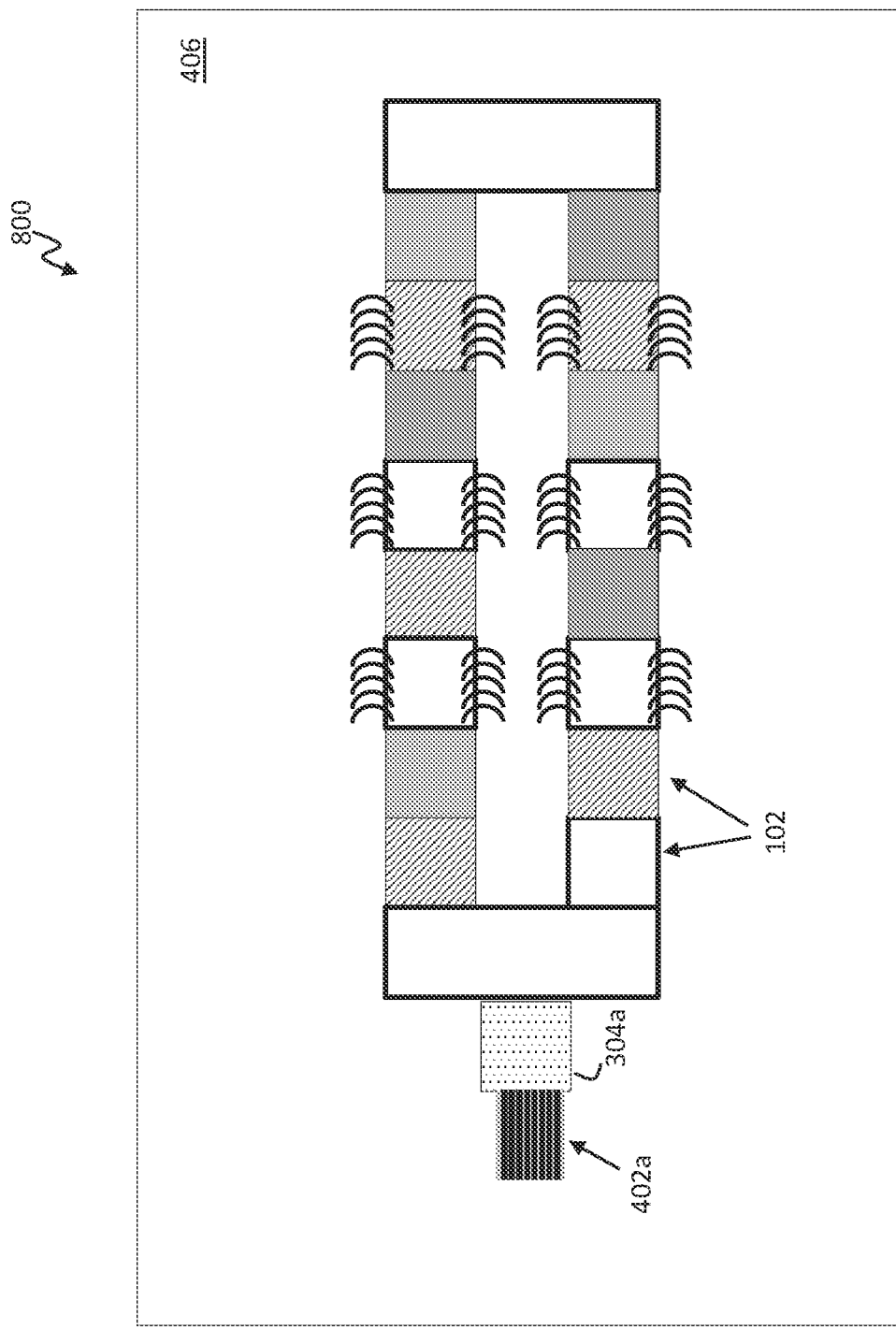
FIG. 8 is a diagram of a top view of an example packaged assembly, illustrating that the subcircuits can be standardized.

FIG. 8 shows an example of a packaged assembly 800, illustrating that the subcircuits can be standardized. In other words, the subcircuits 102 can be cut to a standard size (within a particular tolerance) such that they can form a closed loop when butt-coupled. For example, during dicing of the subcircuits during fabrication, a given dimension (e.g., width, length, height, etc.) of the subcircuits may vary+/−10 microns. In some embodiments, the resulting variation depends on the particular fabrication process or type of subcircuit produced.

Figure 9:
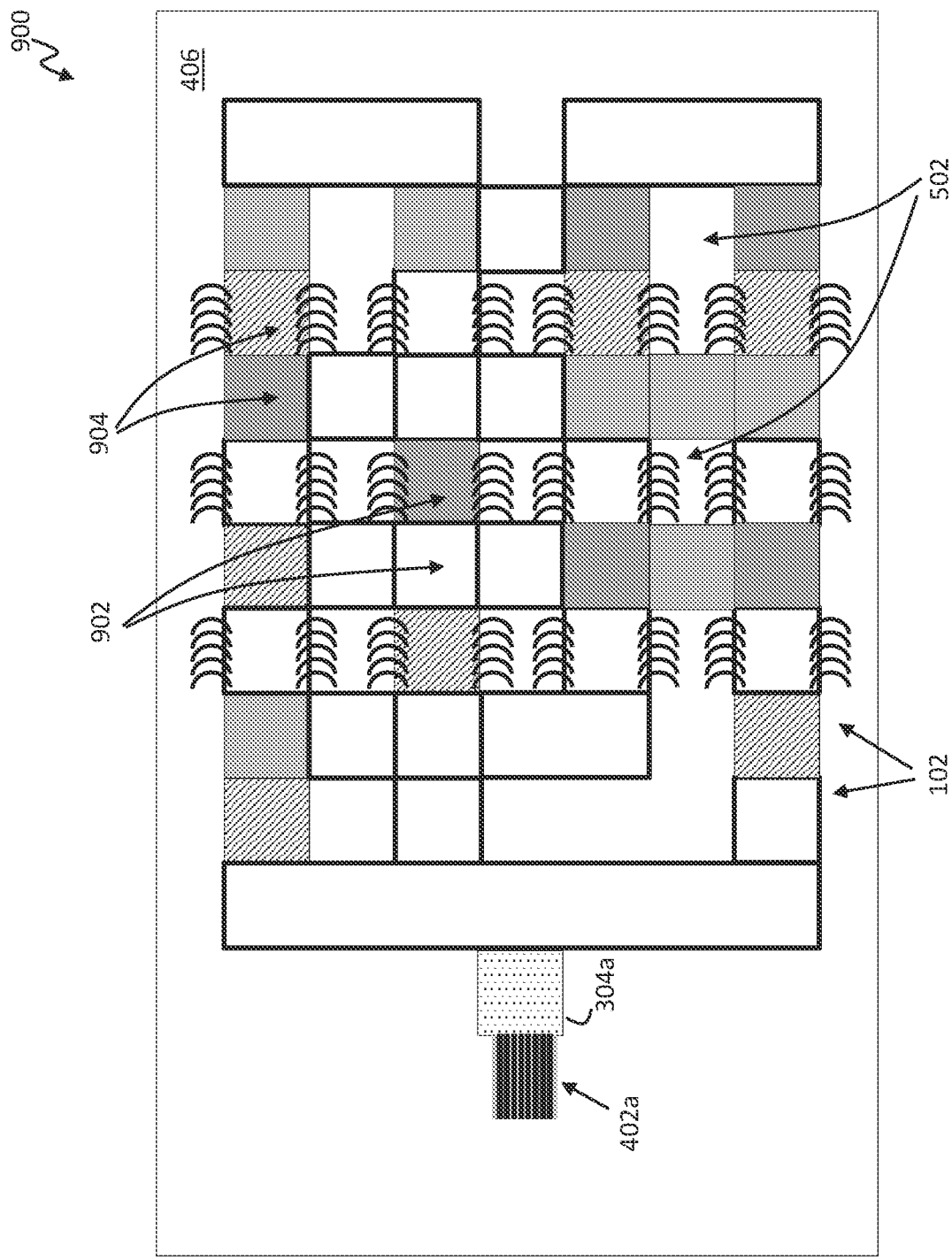
FIG. 9 is a diagram of a top view of an example integrated photonics assembly formed into a "checker" type assembly.

FIG. 9 shows an example of an integrated photonics assembly 900 that is formed into a "checker" type assembly. The checker-type assembly includes empty spaces or gaps 502 between subcircuits 102. These gaps 502 can permit the wirebonding of some or all subcircuits 102 to the host PCB 406 without needing to route electrical signals from the subcircuits (e.g., subcircuit 902) near the center of the assembly 900 to the outer subcircuits (e.g., subcircuits 904) and/or to external circuits.

Light Transfer in Photonic Integrated Subcircuits

FIG. 10A depicts an example implementation of a 1D integrated photonics assembly 1000. Referring to the subcircuits from left to right, the example assembly 1000 includes:
(i) a subcircuit 1002a including a fiber spot-size convertors;
(ii) a subcircuit 1004a including tunable splitters;
(iii) a subcircuit 1006a including a waveguide crossing;
(iv) a subcircuit 1004b including tunable splitters;
(v) a subcircuit 1006b including a waveguide crossing;
(vi) a subcircuit 1004c including tunable splitters; and
(vii) a subcircuit 1008 including tap couplers and photodetectors 1009 configured to monitor the transmitted light. Subcircuit 1002a can be made from silicon nitride. Subcircuits 1002a, 1002b having fiber spot-size convertors can be made in a different platform which supports higher coupling efficiency to optical fibers. Subcircuit 102a may require a different oxide thickness in the interface 1001a (with fiber array 402a) than the oxide thickness in interface 1001b (with subcircuit 1004a) to efficiently couple light from the fiber array to subcircuit 1004a. Subcircuit 1004a (also referred to as subassembly 1010) can function as a 2×2 optical switch (in this case, including two 2×2 optical switches). Subassembly 1012 of assembly 1000 can function as a 4×4 optical switch. Portion 1014 of assembly 1000 can function as a non-blocking optical switch (e.g., a 4×4 non-blocking optical switch). Subcircuit 1008 can be used enable software control of the optical switch 1014.

Referring to FIGS. 10B-10C, in this example assembly 1000, a subset of the subcircuits is standardized such that these subcircuits (also referred to as standardized subcircuits 1016) have a standard width 1018a (e.g., 1 mm, 1.5 mm, 2 mm, etc.) and a standard length 1018b (e.g., 1 mm, 1.5 mm, 2 mm, etc.). For example, the standardized subcircuits 1016 includes subcircuits 1004a, 1006a, 1004b, 1006b, 1004c, and 1008. The standard subcircuit 1016 has optical and electrical ports are standardized to be in the same respective position for each standardized subcircuit 1016. For instance, in a given standardized subcircuit 1016, input ports 1020 are in the same position along one edge (e.g., the left edge) and output ports 1022 are in the same position along another edge (e.g., the right edge). In some cases, the standardized subcircuit can include electrical ports (e.g., pads) 1024 in the same positions along at least one edge (e.g., top and bottom edges), as indicated by the dashed-line box.

As previously discussed, a subcircuit can be swapped with another subcircuit in a given assembly. Accordingly, FIGS. 11A-11B provide alternative embodiments of the assembly 1000. FIG. 11A illustrates assembly 1100a in which subcircuit 1008 is swapped for subcircuit 1026. In effect, the monitor photodetectors (of subcircuit 1008) are interchanged for variable optical attenuators 1028 (of subcircuit 1026), thereby generating an assembly 1100a with a different functionality from assembly 1000.

In another example, FIG. 11B illustrates assembly 1100b in which subcircuits 1006a is swapped with subcircuit 1004b. This may be done to alter the functionality of the assembly. Alternatively, in example assembly 1100b, crossing-type subcircuit 1006a is swapped for a tunable splitter-type subcircuit and tunable splitter-type subcircuit 1004b is swapped for a crossing-type subcircuit, relative to the assembly 1100a. This may be helpful when subcircuit 1006a or 1004b is needs to be replaced (e.g., because it is faulty).

Assembly Monitoring

Described herein are systems, devices, and methods monitoring the integrated photonics assemblies. In some implementations, monitoring can include testing the subcircuits and/or using the subcircuits as disposable components in a sensor or other circuit. The monitoring of the assembly may be performed during assembly or post-assembly. The monitoring may be performed one or more times, periodically, intermittently, or continuously.

It can be beneficial to monitor the subcircuits to ensure alignment between two or more subcircuits. The alignment between two or more subcircuits can influence the optical coupling efficiency between the subcircuits. Alignment may be performed using passively and/or actively. In active alignment, a feedback signal may be used to determine whether the subcircuits are aligned. In various embodiments, a monitoring circuit can be configured to be attached to and/or be part of a subcircuit. The monitoring circuit may monitor light that couples into the subcircuit. A light path can be configured such that at least a portion of the received light can travel through the monitoring circuit. The light may then be transmitted back out of subcircuit.

An example monitoring system (e.g., including the monitoring circuit) can include a laser and a photodetector to determine optical loss within a subcircuit and/or among subcircuits. This arrangement may permit measurement of the quality of the optical coupling between the subcircuits. The measurement can be used to determine how well the subcircuits are aligned. In some embodiments, once the subcircuits are aligned and fixed in position (e.g., in an assembly), a monitoring circuit is used to determine the coupling efficiency between the subcircuits at any time.

In various embodiments, two subcircuits can be aligned such that there is less than 1 dB, less than 0.5 dB, less than 0.1 dB, less than 0.5 dB, or less of optical loss in light transfer between the two subcircuits. In various embodiments, two subcircuits can be aligned such that there is greater than 75%, greater than 80%, greater than 85%, greater than 90%, greater than 95%, greater than 97%, greater than 99%, or more coupling efficiency.

Passive alignment techniques can include aligning the subcircuits by visual inspection and/or self-alignment techniques. A monitoring circuit may be used to determine the degree of alignment between subcircuits based on passive alignment.

In some embodiments, the monitoring circuit for each subcircuit is individually configured. The subcircuit may have a wavelength dependence and, based on this wavelength dependence, the monitoring circuit may monitor the response of the respective subcircuit. If, for example, the wavelength dependence of the subcircuit has changed, then the monitoring circuit may isolate the single subcircuit response to align or monitor the subcircuit further. In some embodiments, monitoring circuits include photodetectors to monitor light emitted by the subcircuits through grating couplers. Such a monitoring circuit may benefit from a detection method above the subcircuits, which can be used by a camera configured to detect light from photonic circuits to distinguish between the light emitted from the top of each subcircuit. In some embodiments, the monitoring circuit is configured to access the metal pads of each subcircuit to monitor the response of the respective subcircuit.

FIG. 12A depicts an assembly 1200a of four integrated photonic subcircuits 1202a, 1202b, 1202c, 1202d (collectively referred to as 1202), in which each subcircuit is configured to transfer light to an adjacent subcircuit. Each subcircuit 1202 is coupled to and/or includes a respective monitoring circuit 1204 (including circuits 1204a, 1204b, 1204c, 1204d). The monitoring circuit 1204 can determine (e.g., measure) the optical coupling efficiency between two subcircuits by monitoring the light traveling in the light path 1206. In some embodiments, these circuits are configured such that the coupling efficiency of a particular subcircuit-to-subcircuit interface may be distinguished from one another (refer to FIGS. 16A-16B for an illustrative example). The monitoring circuit may enable subcircuits to be added or optically coupled to a base subcircuit one-by-one while maintaining a high coupling efficiency.

In some cases, each monitoring circuit may include multiple input and/or output waveguides. For example, with two waveguides, light may be transmitted and received. This may reduce the need for additional external components and, in some cases, reduce ambiguity of where the light originates. Additionally or alternatively, a single light path or more than two light paths may be used. FIG. 12B shows four integrated photonic subcircuits 1208a, 1208b, 1208c, 1208d (collectively referred to as 1208), in which each subcircuit is configured to transfer light to an adjacent subcircuit. Each subcircuit 1208 is coupled to and/or includes a respective monitoring circuit 1210 (including circuits 1210a, 1210b, 1210c, 1210d). In this case, two light transfer paths 1212 are used between each subcircuit to determine respective optical coupling. The two light paths may be useful for determining optical coupling efficiency in both directions (e.g., the two opposite directions). In some embodiments, more than two light paths are monitored.

To enable facile alignment monitoring, two monitoring circuits may be placed on opposite sides of the subcircuits. This may increase angular alignment accuracy. For example, this double optical coupling monitoring may increase the rotation alignment accuracy for various optical coupling methods. As described below, in the space on a subcircuit between the two monitoring circuits (e.g., 1304a and 1304b), a "useful" circuit may be placed such that the monitoring circuits and useful circuit do not interfere with each other. The useful circuit may have independent functionality and/or purpose. For example, by bringing together the useful circuits may the function of the overall assembly be realized.

FIG. 13A shows four integrated photonic subcircuits 1302a, 1302b 1302c, 1302d (collectively referred to as 1302), in which each subcircuit is configured to transfer light to an adjacent subcircuit. In this case, for each subcircuit 1302, two respective monitoring circuits 1304 with light paths 1303 are used between each subcircuit to determine optical coupling. Therefore, subcircuit 1302a has monitoring circuits 1304a, 1304b; subcircuit 1302b has monitoring circuits 1304c, 1304d; subcircuits 1302c has monitoring circuits 1304e, 1304f; and subcircuit 1304g, 1304h. The two monitoring circuits may be positioned on opposite sides of a subcircuit. FIG. 13B illustrates a similar set of photonic subcircuits 1306a, 1306b 1306c, 1306d (collectively referred to as 1306), in which each subcircuit has two respective monitoring circuits. For example, subcircuit 1306a has monitoring circuits 1308a, 1308b and each monitoring circuit monitors a respective two light paths 1310.

Figure 14B:
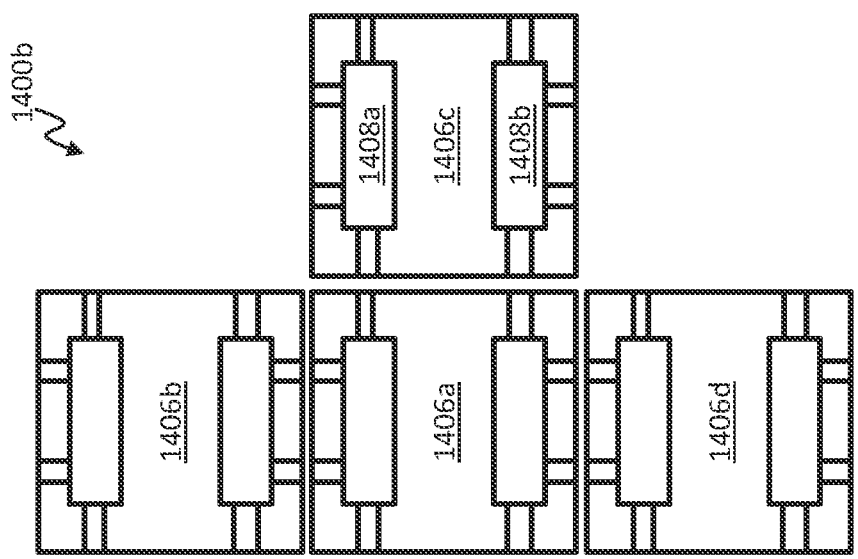
FIGS. 14A-14B are diagrams of top views of example assemblies including four subcircuits each.
Figure 14A:
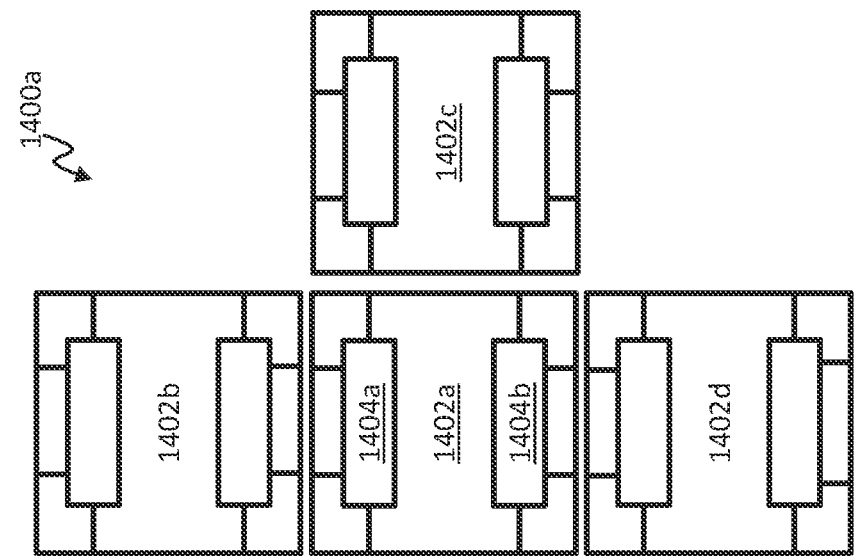

FIGS. 14A-14B illustrate example assemblies 1400a, 1400b of four subcircuits each. In this case, the subcircuits are assembled in two dimensions. For example, assembly 1400a includes subcircuit 1402a coupled to each of subcircuit 1402b, 1402c, and 1402d. Each subcircuit has a monitoring circuit configured to monitor light in two dimensions. For example, subcircuit 1402a has a first monitoring circuit 1404a and a second monitoring circuit 1404b. Assembly 1400b includes subcircuits 1406a, 1406b, 1406c, 1406d in which each subcircuit includes two respective monitoring circuits (e.g., 1408a, 1408b), in which each monitoring circuit has two respective light paths.

Figure 15A:
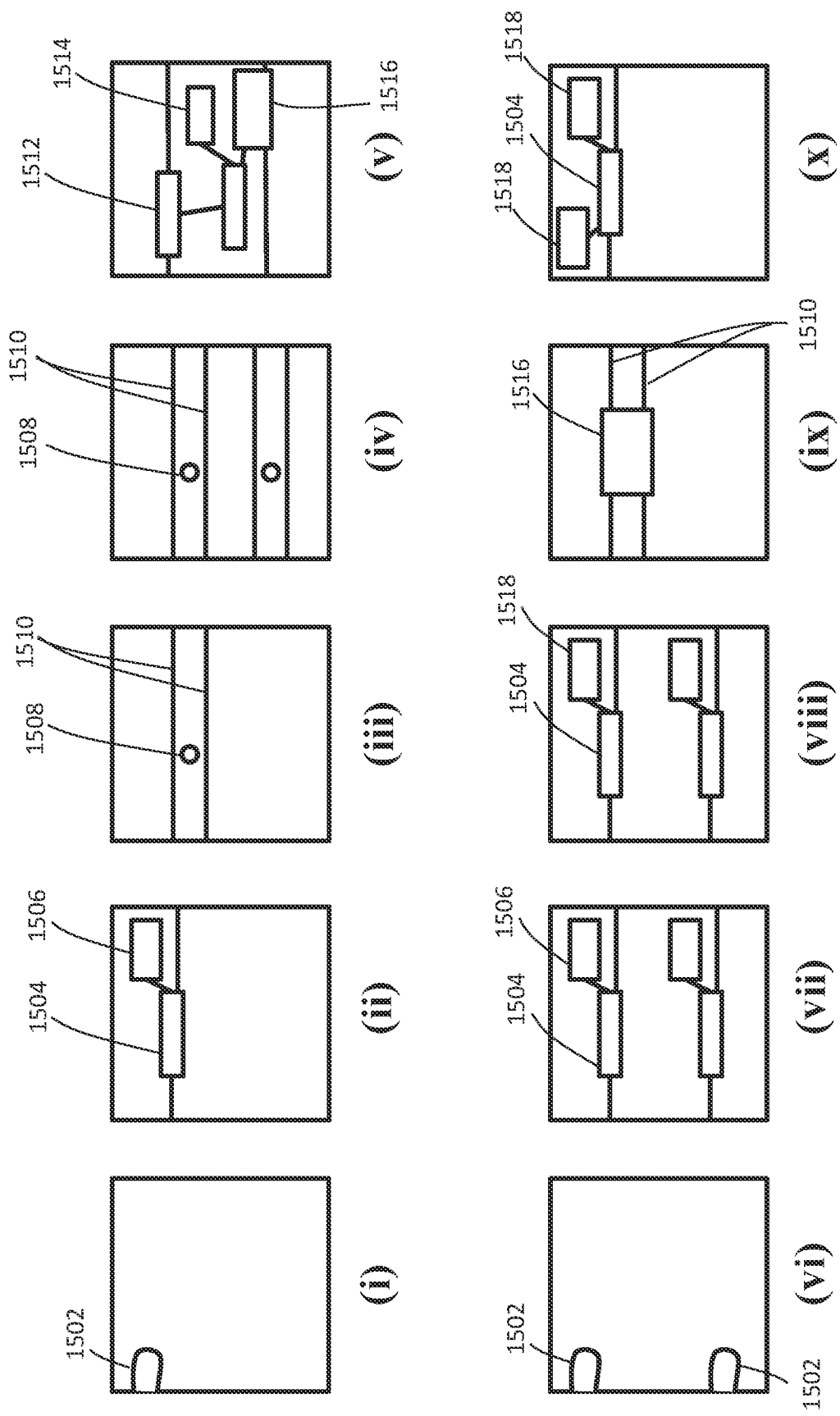
FIGS. 15A-15B are diagrams of top views of examples photonic monitoring circuits for photonic integrated subcircuits.
Figure 15B:
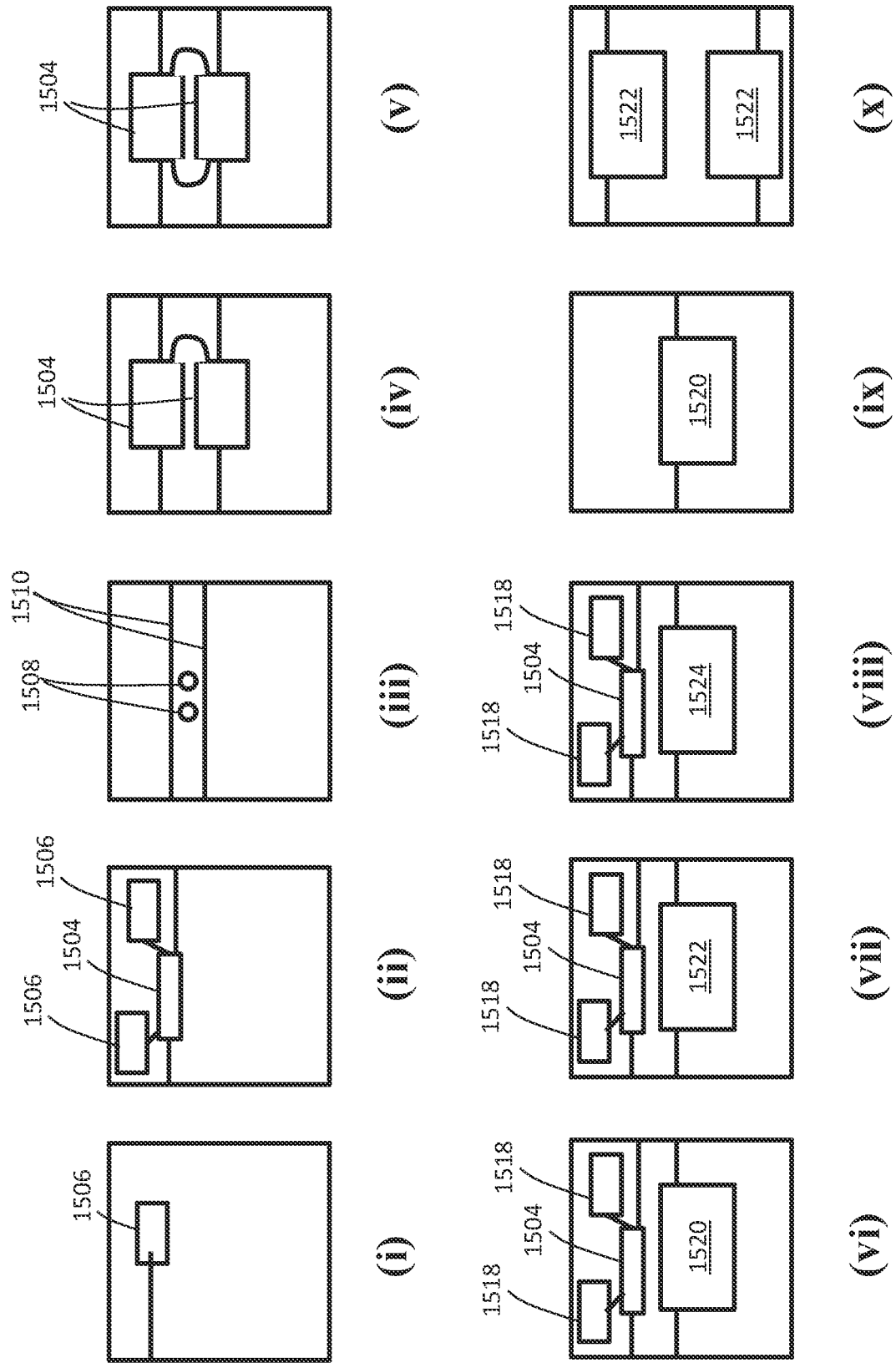

FIGS. 15A-15B provide several examples of photonic monitoring circuit implementations, e.g., configured to determine whether two or more subcircuits are aligned. FIG. 15A(i) depicts a waveguide loopback 1502. This waveguide 1502 receives and returns the light. A photodetector coupled directly or indirectly to this type of subcircuit can determine the degree of alignment (with an adjacent subcircuit) based on the determined optical loss in the returned light. FIG. 15A(ii) depicts a splitter 1504 coupled to a monitoring photodetector 1506. The splitter 1504 is configured to split the received light and send to the photodetector 1506 to determine how well light was received from an adjacent subcircuit.

FIG. 15A(iii) depicts an add-drop ring resonator 1508 which is positioned between two waveguides 1510 and configured to resonate based on the light wavelength in the waveguides 1510. The resonator 1508 may return one or more particular wavelengths. For example, if a given subcircuit has a slightly different add-drop ring, then the monitoring circuit may distinguish the coupling efficiencies for each subcircuit interface. FIG. 15A(iv) depicts a circuit similar to (iii) but with two ring resonators 1508 (each between two waveguides 1510), one situated towards the top and one towards the bottom of the subcircuit. FIG. 15A(v) depicts a double power splitter 1512, followed by a module 1514. The module 1514 can be a photodetector (PD) or out-of-plane coupler (e.g., a grating coupler (GC). The lower splitter (of the double power splitter 1512) can be coupled to a wavelength demultiplexer (WDM)) 1516.

FIG. 15A(vi) depicts a double waveguide loopback 1502. FIG. 15A(vii) depicts two replicas of the circuits of FIG. 15A(ii). FIG. 15A(viii) is similar to FIG. 15A(vii) but employs grating couplers 1518 instead of photodetectors 1506. In this circuit, the out-of-plane emitted light may be detected using a free-space photodetector, a lens system, or a fiber. FIG. 15A(ix) depicts a WDM 1516 coupled between two waveguides. Examples of such circuits include a ring resonator, a WDM having a flat top to make it temperature independent, or a contra-directional coupled Bragg grating reflector. The WDM can be configured to reflect back light at a particular wavelength. FIG. 15A(x) depicts a power splitter with grating couplers 1518 on both sides. Note that most if not all circuits in FIGS. 15A-15B may be configured to monitor light transferred from any side of the subcircuit.

FIG. 15B(i) depicts a waveguide ending in a photodetector 1506. FIG. 15B(ii) depicts a power splitter 1504 with photodetectors 1506. FIG. 15B(iii) depicts a double ring resonator 1508 (e.g., having a flat top), both between waveguides 1510. FIG. 15B(iv) depicts a power splitter 1504 followed by another power splitter 1504. FIG. 15B(v) depicts a circuit similar to FIG. 15B(iv) but useful in both directions. FIG. 15B(vi) depicts a circuit similar to FIG. 15A(viii) but including a separate channel with a wavelength dependent reflector 1520. This can helpful for subcircuits having wavelength-dependent properties, as described herein. FIG. 15B(vii) is similar to circuit of FIG. 15B(vi) but includes a Bragg reflector 1522. FIG. 15B(viii) is similar to the circuit of FIG. 15B(vi) but with a unique wavelength reflector 1524 configured for the particular subcircuit. FIG. 15B(ix) depicts a wavelength dependent reflector 1520 as the sole alignment circuit. FIG. 15B(x) depicts two Bragg reflectors 1522 to measure the alignment accuracy at two different points using the reflected light.

In the above-described monitoring circuits of FIGS. 15A-15B, the following features may be included. The splitters may have any splitting ratio or implementation. The grating couplers (GC) may emit light out-of-plane, configured at a specific angle. The monitoring circuit may utilize one or more GCs that emit at different angles to distinguish between subcircuits. The wavelength demultiplexer (WDM) may have any implementation including, e.g., ring resonators, echelle gratings, Bragg gratings, arrayed waveguide gratings, counter-directional coupling Bragg gratings, etc. In some embodiments, the WDM is configured such that its response is temperature independent, i.e., a flat-top response over a certain wavelength band. This can help ensure that the alignment accuracy monitoring does not change as a function of temperature but only as a function of misalignment. This may be important when monitoring the alignment accuracy during fabrication (e.g., during UV or thermal curing epoxy).

FIG. 16A shows an example one-dimensional assembly 1600 of three subcircuits 1602a, 1602b, 1602c (collectively 1602), in which each subcircuit has at least one monitoring circuit 1604 and a useful circuit 1606. Together, the useful circuits 1606 of two or more subcircuits 1602 may form a larger useful circuit. One of the subcircuits 1602 may be coupled to a fiber array 402a. The fiber array 402a can include multiple optical fiber. The outer fibers 1608 of the fiber array 402a may be used for monitoring the optical coupling efficiency between subcircuits 1602. A laser 1610 may be coupled to the fiber array to provide the light source, e.g., for monitoring the alignment between subcircuits. In some cases, a photodetector 1612 can be coupled into the fiber array and used to monitor light externally.

As discussed above, the subcircuits and/or their respective interfaces can be configured to be wavelength dependent. FIG. 16B provides a simplified representation of FIG. 16A to illustrate an example of wavelength dependence of the interfaces 1614a, 1614b, 1614c between the subcircuits. In this example, interface 1614a is between fiber array 402 and subcircuit 1602a and responds to light with wavelength 1616a; interface 1614b is between subcircuit 1602a and subcircuit 1602b and responds to light with wavelength 1616b; interface 1614c is between subcircuit 1602b and subcircuit 1602c and responds to light with wavelength 1616c. Based on the response from an interface, the photodetector(s) 1612 coupled to the front of the fiber array 402a is able to determine how well aligned two adjacent subcircuits are. In some embodiments, the laser 1610 is tunable to tune the wavelength of the inputted light to the specific WDM of the particular subcircuit (e.g., subcircuit 1602b and not 1602a) in the assembly 1600. In this example, each monitoring circuit can include a WDM to enable the PD 1612 to determine the coupling efficiency between subcircuit 1602a and 1602b, not between 1602b and 1602c.

Figure 17:
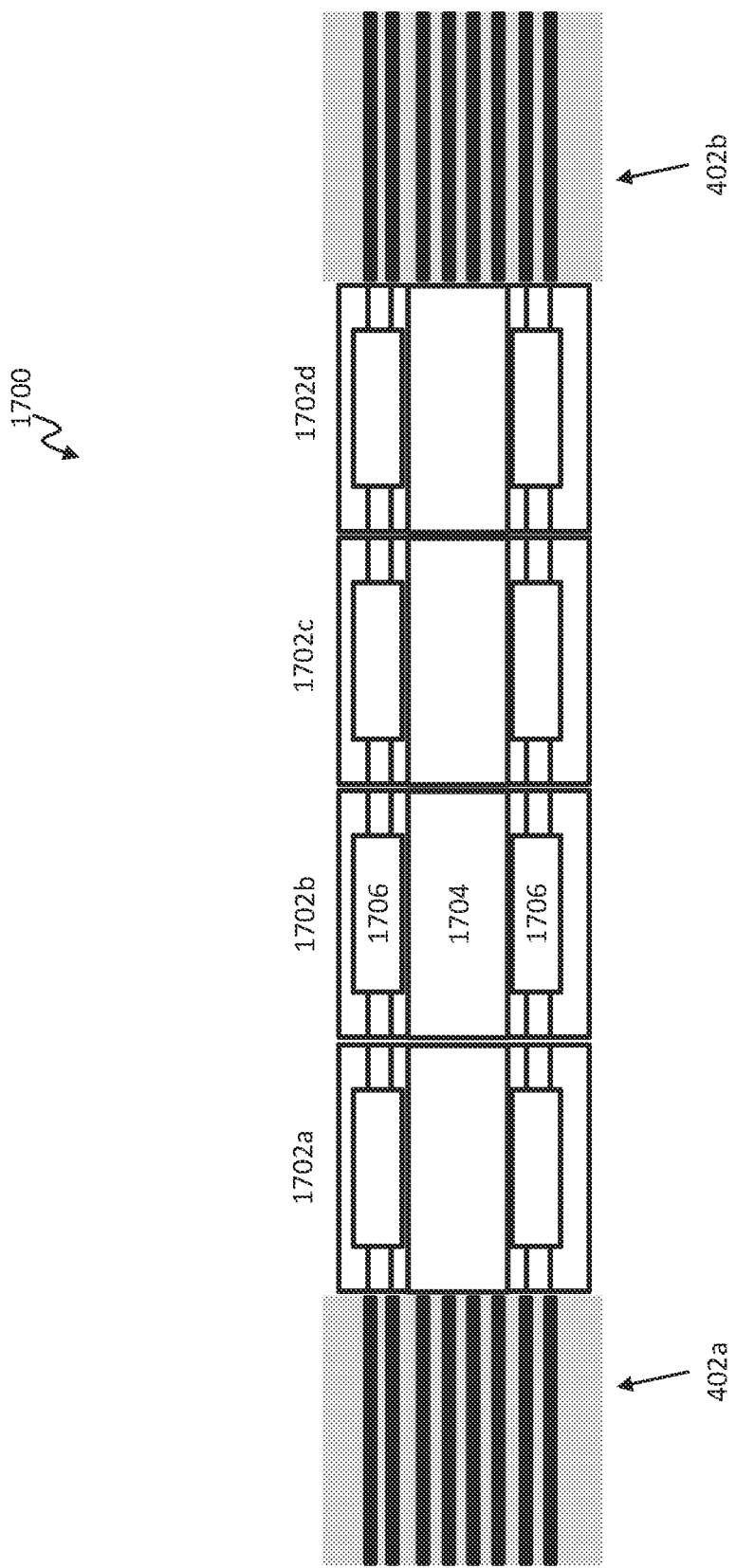
FIG. 17 is a diagram of a top view of an example 1D integrated photonics assembly including four subcircuits.

FIG. 17 illustrates a one-dimensional assembly 1700 of four subcircuits 1702a, 1702b, 1702c, 1702d (collectively referred to as 1702). In this case, light can be coupled to fibers on the left and/or right through a first fiber array 402a and a second fiber array 402b. It can be beneficial for monitoring circuits to monitor light bi-directionally. In particular, there are many ways to build this assembly 1700. For example, the assembly 1700 may be initiated from the left by coupling the fiber array 402a to subcircuit 1702a. Alternatively, the assembly may be initiated from the right by coupling fiber array 402b to subcircuit 1702d. In some embodiments, the assembly 1700 is constructed in two or more portions (e.g., partly from the left and partly from the right). In some embodiments, the subcircuits 1702 is assembled before adding the fiber arrays 402a, 402b. As subcircuits 1702 are added to the assembly, the monitor circuits are used as a feedback mechanism to monitor alignment.

Assembly Alignment and Packaging

Described herein are example systems and methods for passive alignment and/or active alignment of subcircuits. In various embodiments described herein, the alignment systems and methods may feature a receptacle configured with complementary alignment features that can be used to assemble and optically connect many subcircuits at a given time. Further, the subcircuits may be configured to interact with the receptacles to achieve alignment.

As previously discussed, for some subcircuits, the transfer of light is in-plane and by butt-coupling the facet of one subcircuit is positioned adjacent to the facet of the other subcircuit. The input and output optical modes of the subcircuits are configured such that the output(s) match as closely as possible to the input(s) in order to enhance the coupling efficiency. In some embodiments, the mode at the output of the first subcircuit is configured to match the mode at the input of the second subcircuit, adjacent to the first. The modes may be configured even if the waveguide output and input cross-sections themselves are different sizes.

The mode can be configured to be significantly large in order to increase the alignment tolerance of the subcircuits with respect to each other. For example, a mode size can be 3 um, which translates into a 300 nm alignment accuracy for 0.2 dB insertion loss. One way to create such a large mode is to use an optical spot-size convertor on the subcircuits which adiabatically converts a small optical mode from a waveguide to a large mode at the edge of the subcircuit. For example, an implementation of a spot-size convertor is an inverted taper.

Furthermore, the input/output waveguide may be angled in-plane with respect to the facet of the subcircuit in order to reduce back reflections. Anti-reflection coatings may be applied to the subcircuit facets in order to reduce reflections further. In order to get efficient optical coupling between the subcircuits, it is beneficial for all six axes of the subcircuits to be optimized accurately. For instance, two subcircuits can be aligned in the x, y, z axes and all three angles (pitch, roll, and yaw) such that the optical input and output modes of the subcircuit travel along the same axis and to make sure that the subcircuits may be attached with a minimal gap in between.

One way to align subcircuits in six degrees of freedom is to use a hexapod and actively monitor the coupling efficiency between the subcircuits. This method is very cumbersome and slow because light needs to be coupled in and out of the subcircuits while aligning, or an infrared camera needs to be used, etc. It is also a serial process where one may only align one subcircuit at a time, which is not cost-effective when combining, for example, 10 or 20 subcircuits.

Figure 18:
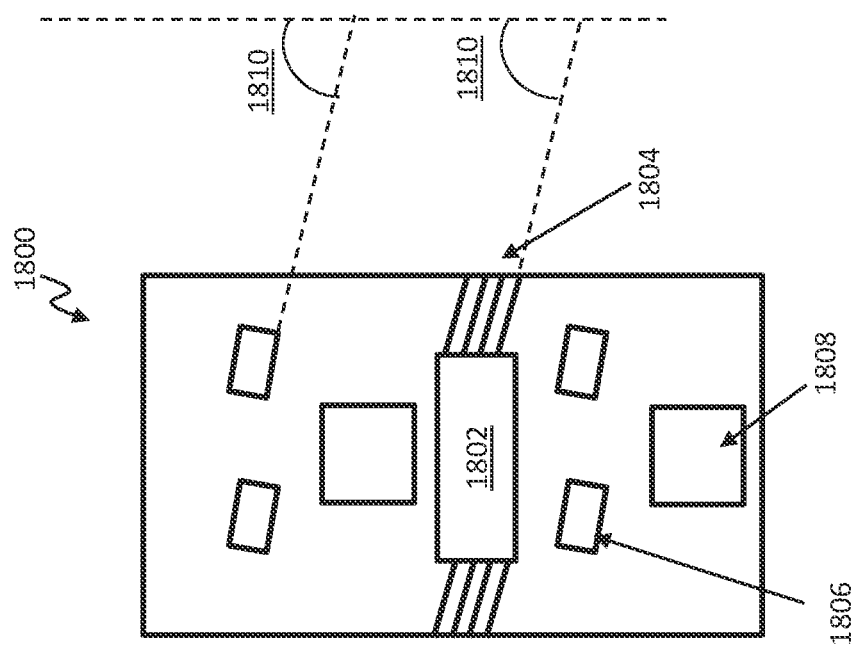
FIG. 18 is a diagram of a top view of an example embodiment of a subcircuit.

One aspect of the present disclosure is a method to align or pre-align optical subcircuits by passive alignment techniques. The subcircuits can be placed on a receptacle that is fabricated separately. FIG. 18 illustrates the top view of an example embodiment of a subcircuit 1800. The subcircuit 1800 includes a photonic circuit 1802, input and output waveguides 1804, and features 1806, 1808 for passive and/or semi-passive alignment. The deep trench features 1806 may be angled having the same angle 1810 as the waveguides 1804. The oxide open 1808 may be rectangular without a rotation relative to the subcircuit. These alignment features are configured to mate with the complementary features of the appropriate receptacle.

In FIG. 18, the alignment features can be formed by etching in the subcircuit a so-called oxide open 1808, which etches up to the core layer of the waveguide, and a deep trench 1806, which etches to more than 50 um deep. Other alignment features may be used including pyramids, inverted pyramids, v-grooves, features that 3D-printed of any shape, features that are formed using nano-imprint, features that are formed using photo-sensitive resist or polymer (SU8), etc. Each alignment feature is responsible for the passive alignment of at least one degree of freedom. Multiple alignment features may have the same functionality and be redundant or create an elastic averaging effect which increases the alignment accuracy.

The subcircuit can be fabricated on a wafer-scale. The wafer can then be diced to create the subcircuits. An important boundary condition is that the size of the subcircuits may vary since the dicing positional accuracy is typically +/−15 um. In some cases, this boundary condition can be compensated for in the alignment features.

It is beneficial for the edge of the subcircuit where light transfer occurs be in ideal or near ideal condition. The edge may have a side wall angle of 90 degrees. In some embodiments, the edge of the subcircuit has another angle such that two adjacent subcircuits have complementary angles or angles that are negative such that the input and output points of the waveguides may be aligned very close together in order to reduce the diffraction efficiency loss. The subcircuit facet may be smoothed using mechanical polishing or stealth dicing to create a smooth optical facet.

The degree of freedom along the x-direction, i.e., the direction along the width or along the direction of the input/output waveguides as in FIG. 18, is fixed by pushing the two subcircuits against each other until the two subcircuits physically touch. This can be important because the subcircuit dimensions may not be accurately fabricated due to dicing variations. One or more degrees of freedom may be aligned using the alignment features. In the alignment feature implementation of FIG. 18, the vertical alignment (z-axis) is fixed using an oxide etch feature. This etch removes the oxide from the top of the waveguide. The height reference is then the top of the waveguide which is close to the middle of the mode-size. The height reference may be anywhere in the subcircuit stack as long as it results in height matching of mode-sizes of the adjacent subcircuits. Not all subcircuits may be fabricated in the same process and have the same stack-up, so the height reference etch may be different.

When the subcircuits have the exact same distance from the core waveguide layer to the top of the subcircuit, then the top of the subcircuit may be used as height reference. However, this is may be atypical since even wafer-to-wafer or intra-wafer variations of the top layer may occur. FIG. 18 illustrates two oxide etches for the vertical alignment but typically at least three positions are needed with these height reference features which then constrains the height, tip and tilt at the same time. The y degree of freedom or the degree of freedom perpendicular to the waveguide direction can be fixed using the deep trench etch features. The x direction or waveguide direction is not constrained using alignment features because the chips may be pushed against each other and physically touch. The rotational degree of freedom can be constrained due to the fact that there is more than 1 lateral alignment feature.

In some embodiments, two or three lateral alignment features are used for a given subcircuit but more features may be in order to leverage elastic averaging. This is particularly true when the subcircuit and/or receptacle alignment features are made of a non-rigid material. Rotational alignment may be attained using the pick and place tool by referencing the edges of the subcircuit or by pushing the subcircuit edges to each other thereby constraining the rotation. Note that the deep trench etch in FIG. 18, which acting as a lateral alignment feature, can be rotated with respect to the subcircuit edge. In some embodiments, this angle of rotation is the same as the angle of the input and output waveguides relative to the edge of the subcircuit. The rotated lateral features thus creates a free degree of freedom along the waveguide direction.

Figure 19:
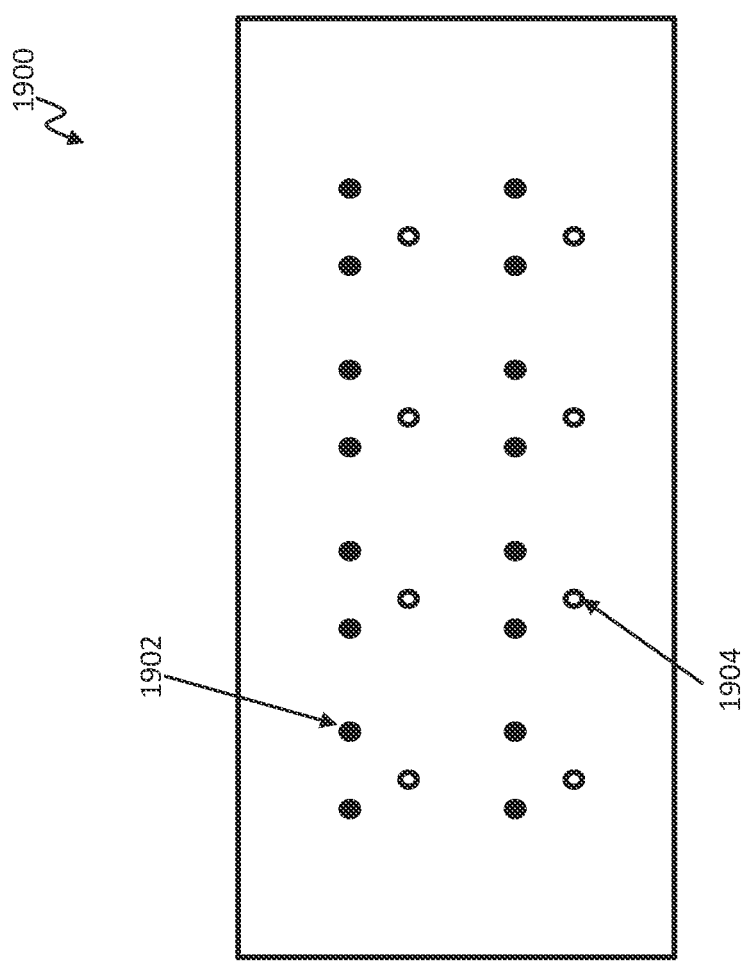
FIG. 19 is a diagram of a top view of an example receptacle configured to be complementary to the subcircuit of FIG. 18 and configured to align two subcircuits of FIG. 18.

FIG. 19 illustrates the top view of a receptacle 1900 configured to be complementary to the subcircuit 1800. The receptacle includes alignment features with different heights that can mate with the subcircuit. Note that the alignment features can be used to align the subcircuits laterally or vertically. For example, lateral alignment features 1902 can be used to align a subcircuit 1800 laterally relative to the receptacle 1900 and/or to adjacent subcircuits. The lateral alignment features 1902 may be any shape as long as they fit in the deep trench etch hole of the subcircuit 1800 and do not touch the bottom of the deep trench (which would constrain the vertical direction). Vertical alignment features 1904 can be used to align a subcircuit 1800 vertically relative to the receptacle 1900 and/or to adjacent subcircuits. The vertical alignment feature may be any shape as long as it does not touch the edges of the oxide etch of the subcircuit. For example, the lateral or vertical features may have a circular, semi-circular, elliptical, rectangular, or other shape.

Figure 20:
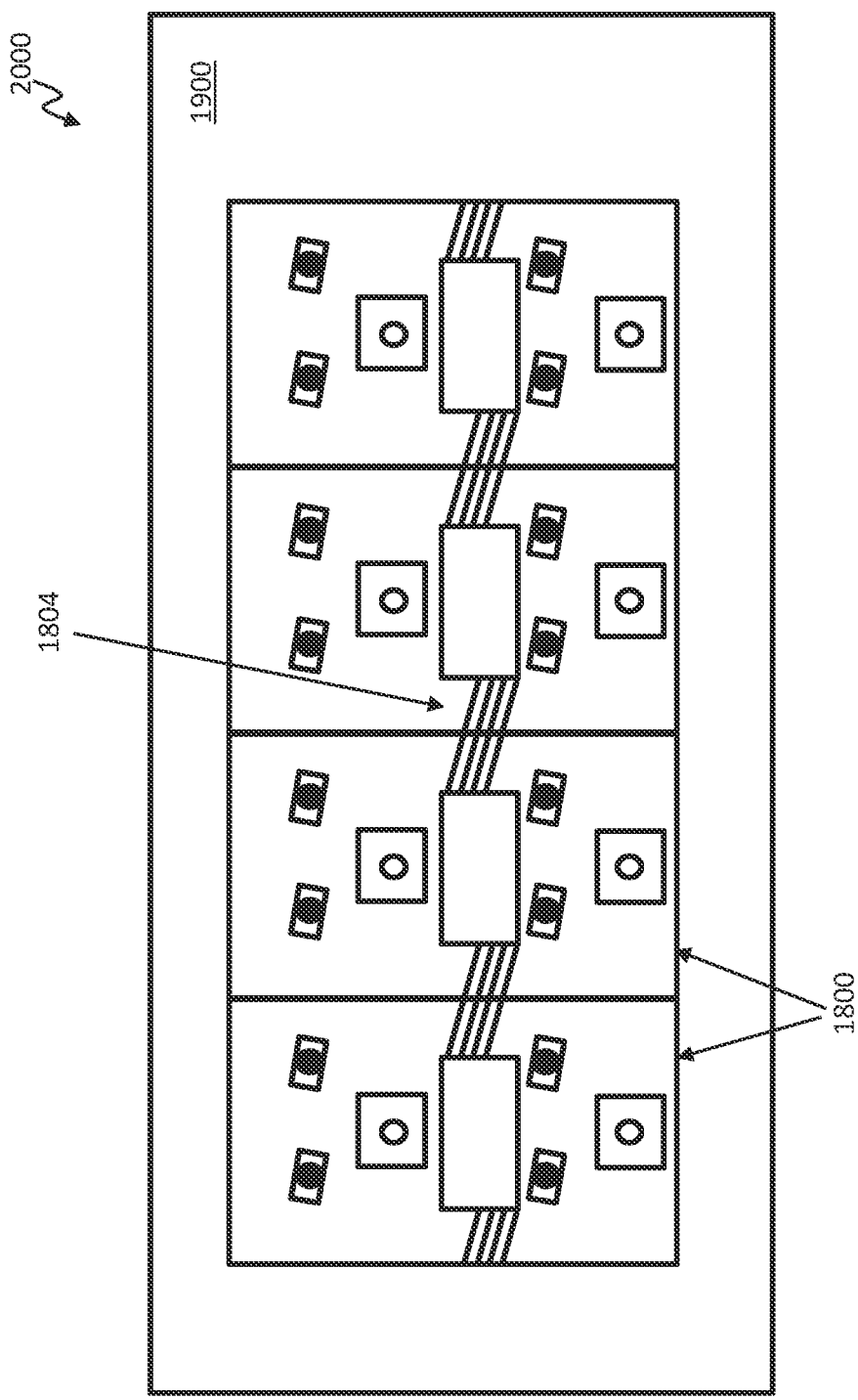
FIG. 20 is a diagram of a top view of multiple subcircuits of FIG. 18A positioned on the receptacle of FIG. 19.

FIG. 20 illustrates the top view of multiple subcircuits 1800 positioned on the receptacle 1900. The complementary alignment features of the subcircuits 1802 and receptacle 1900 are configured such that the waveguides 1804 line up perfectly or near perfectly. This can be true even when the width of the subcircuit varies due to dicing.

In some embodiments, between the facets of the subcircuits, an index matching epoxy (e.g., ultraviolet epoxy, thermal epoxy, two-part epoxy, etc.) are added to glue the two subcircuits together. One issue with attaching subcircuits with epoxy is that it takes time to cure the epoxy. Therefore, it may be beneficial if first all or most of the subcircuits are aligned, epoxy is added, and the epoxy between the facets of the subcircuits is cured all at once outside of the pick and place machine. For this, the chips may need to be mechanically held in place in order to not lose alignment. The alignment features contribute to the mechanical stability of the subcircuits relative to the receptacle. However, further reinforcement may be used, e.g., mechanical clamps or vacuum using vacuum holes or lines in the receptacle. After epoxy curing, the epoxy may glue the subcircuits to the receptacle. The subcircuits may be removed from the receptacle by for example treating the receptacle with and anti-adhesive layer before use. The receptacle may then be used multiple times, thereby decreasing assembly cost. One beneficial factor of using a receptacle temporarily and not permanently is that the top of the subcircuit assembly is now accessible and the subcircuits assembly may be packaged (e.g., by wirebonding, fiber array attachment, PCB board mounting, etc.) in a regular fashion with the top side face up.

Figure 21:
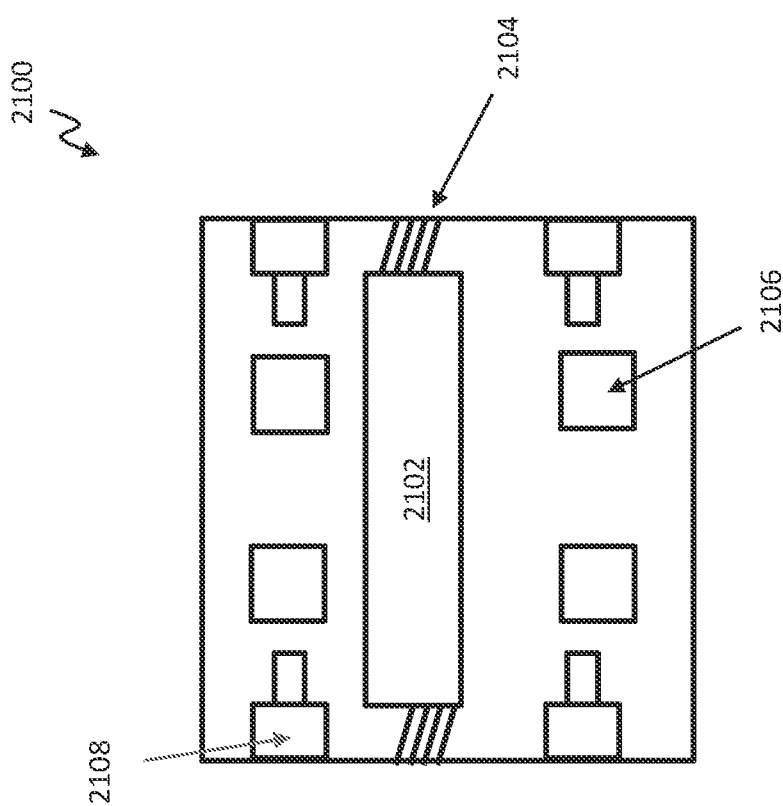
FIG. 21 is a diagram of a top view of an example subcircuit including photonic circuit and input and output waveguides.

FIG. 21 shows the top view of an example subcircuit 2100 including photonic circuit 2102 and input and output waveguides 2104. The subcircuit 2100 is configured with two types of etches, a shallow-type etch (e.g., oxide open) 2106 and a deep-type etch (e.g., deep trench) 2108. In this case, the waveguides are straight, e.g., the angle of the lateral alignment features is zero. The alignment features may have a specific shape such as a funneling shape to guide the alignment process. In this case, many receptacles are used with each receptacle aligning two subcircuits. This has the benefit of having more versality in terms of chip sizes and process differences. Furthermore, the receptacle does not to be removed since one has access to the top of subcircuits in regions where there is no receptacle.

Figure 22:
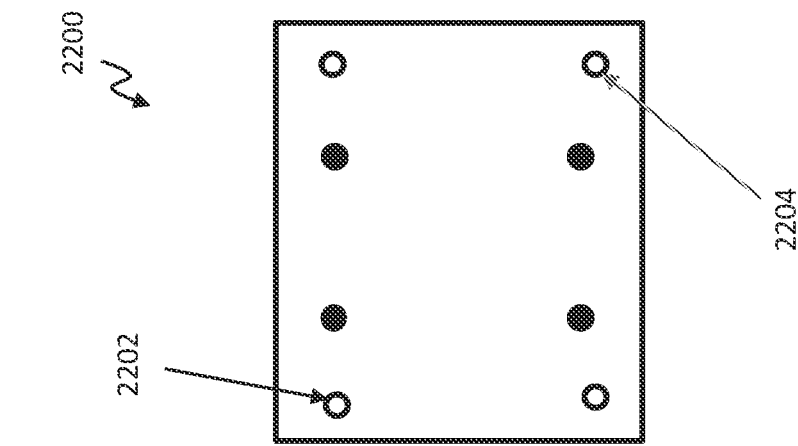
FIG. 22 is a diagram of a top view of an example connector chip that may be used in assembling two subcircuits.

FIG. 22 illustrates a top view of an example connector chip 2200 that may be used in assembling two subcircuits 2100. The connector chip 2200 can be configured with lateral alignment features 2202 and/or vertical alignment features 2204.

Figure 23:
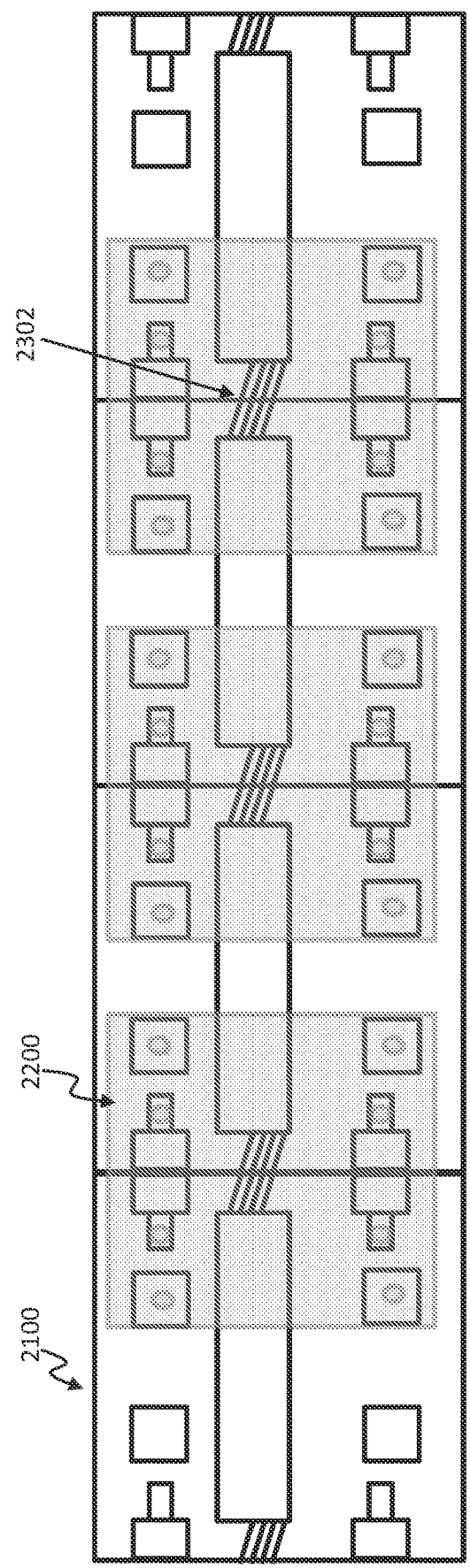
FIG. 23 is a diagram of a top view of an example assembly of subcircuits.
Figure 24A:
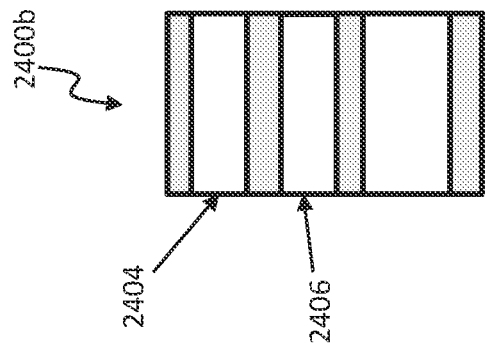
FIGS. 24A-24D are diagrams of top views of example variations of subcircuits.
Figure 24B:
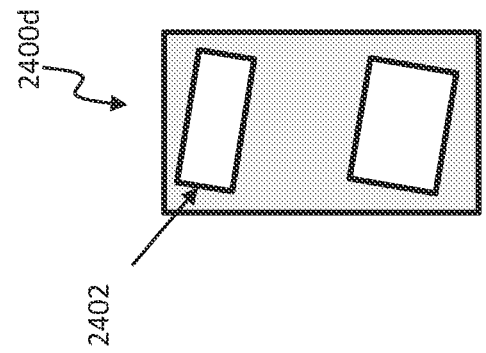
Figure 24C:
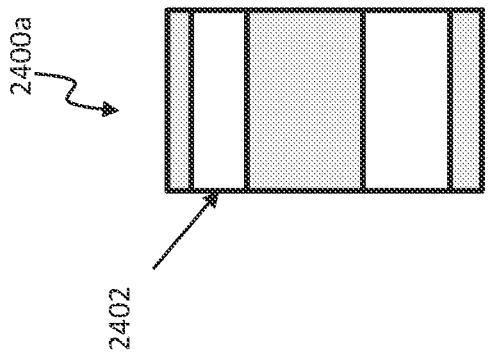
Figure 24D:
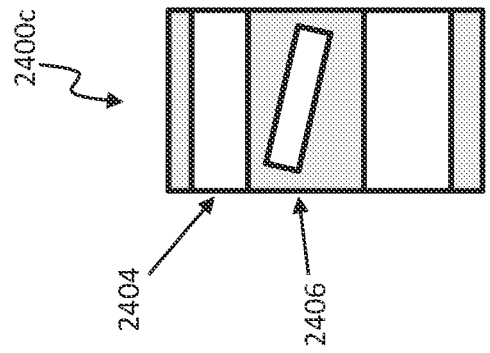

FIG. 23 depicts a top view of an example assembly of subcircuits 2100. The subcircuits 2100 are assembled using connector chips 2200. Each connector chip 2200 combines two subcircuits 2100 such that the input waveguides 2104 of one subcircuit are aligned to the output waveguides 2104 of the other subcircuit (at position 2302).

FIGS. 24A-24D shows top views of example variations for subcircuits 2400a, 2400b, 2400c, 2400d (collectively referred to as 2400). The subcircuits 2400 are configured with etches 2402 that may extend or not extend to the edge of the subcircuit. The etches can include oxide open 2404 or a deep trench 2406. The etches 2402 may be non-angled or angled (relative to the subcircuit 2400). The etches 2402 may be used for either vertical or lateral alignment or both.

FIG. 25A illustrates a top view of a receptacle 2500 configured to receive subcircuits 2400a, 2400b, and/or 2400c. The receptacle 2500 includes vertical and/or lateral alignment feature 2502 and a vertical alignment feature 2504. FIG. 25B illustrates the top view of the receptacle 2500 connected to four subcircuits 2400a. In this case, the alignment features are more rectangular and the receptacle alignment features are also rectangular, touching with a plane of points instead of a vertical line (compare to FIGS. 18-20). The oxide open etch can be used for both vertical and lateral alignment features. The edge of the northmost alignment feature can be used for lateral and rotational alignment.

FIG. 26A illustrates a top view of receptacle 2600 configured to receive subcircuit 2400c. In receptacle 2600, the lateral alignment feature 2602 is angled and, once mated with the subcircuit 2400c, only touches one side or edge of subcircuit 2400c. FIG. 26B illustrates the top view of the receptacle 2600 connection to four subcircuits 2400c. The receptacle 2600 features angled lateral alignment features that are rectangular in shape. In this case, the middle alignment features constrain the chip alignment in the lateral and rotational dimensions.

Figure 27:
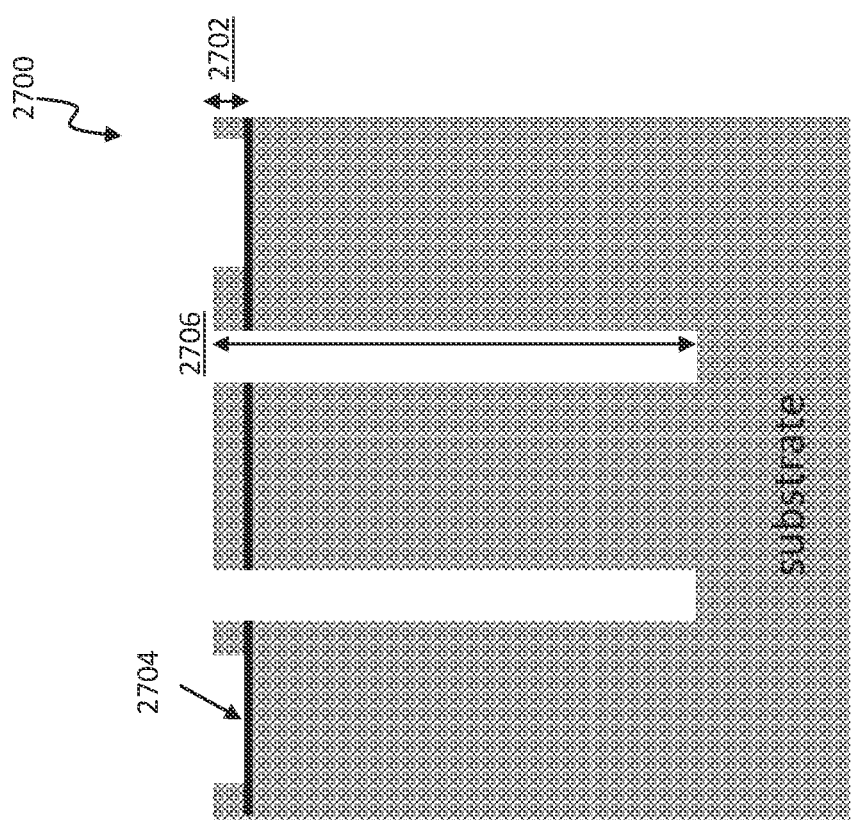
FIG. 27 is a diagram of a cross-sectional view of an example subcircuit.

FIG. 27 is a cross-sectional view of an example subcircuit 2700. The subcircuit 2700 has a shallow etch 2702 (e.g., oxide open) of 5 um which stops at or is close to the waveguide layer 2704 and a deep trench etch 2706 of 80 um. The subcircuit 2700 has a waveguide layer 2704 which guides light and may be used to form input and output couplers and photonic circuits. In some embodiments, the generation of alignment features for subcircuit 2700 takes advantage of processes available in every or most of the fabs. Therefore, the deep trench etch and oxide etch can be useful because they are both options that are available in many fabs and may in some cases be fabricated on the same wafer.

The deep trench is typically used for creating a smooth facet for horizontal fiber coupling. Since a standard single mode cleaved fiber has a 125 um diameter, the deep trench is typically more than 62.5 um deep (half of the fiber diameter). As long as the lateral alignment features on the receptacle (blue in FIG. 9) are not taller than 62.5 um they will not touch the bottom of the deep trench and thus not confine the subcircuit in the vertical direction. This is desirable since the depth of a deep trench is typically difficult to accurately control. The oxide open on the other hand may be controlled with nanometer precision. Another benefit of using the deep trench is that the area that is used for lateral alignment is comparatively large and thus pretty robust to mechanical damage and wear and tear.

Figure 28:
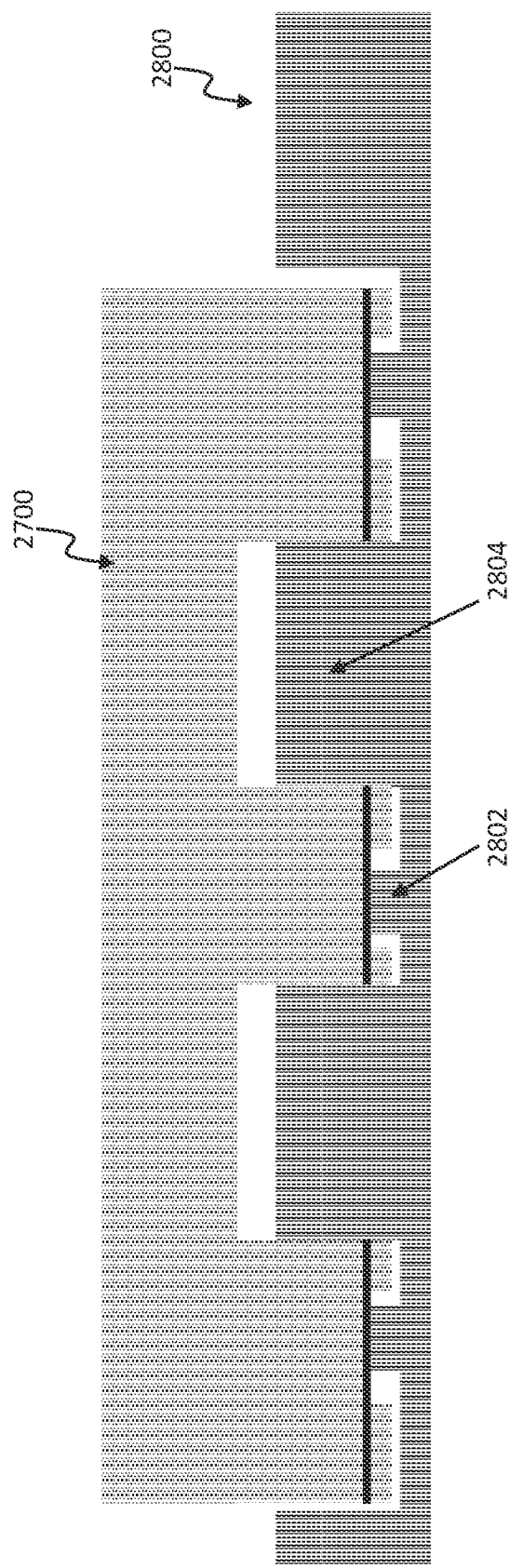
FIG. 28 is a diagram of a cross-sectional view of the subcircuit of FIG. 27 in combination with the receptacle.

FIG. 28 is a cross-sectional view of the subcircuit 2700 in combination with the receptacle 2800. The example receptacle 2800 includes vertical alignment features 2802 configured to mate with the shallow etch 2702 of the subcircuit 2700 and lateral alignment features 2804 configured to make with the deep features 2706.

Figure 29:
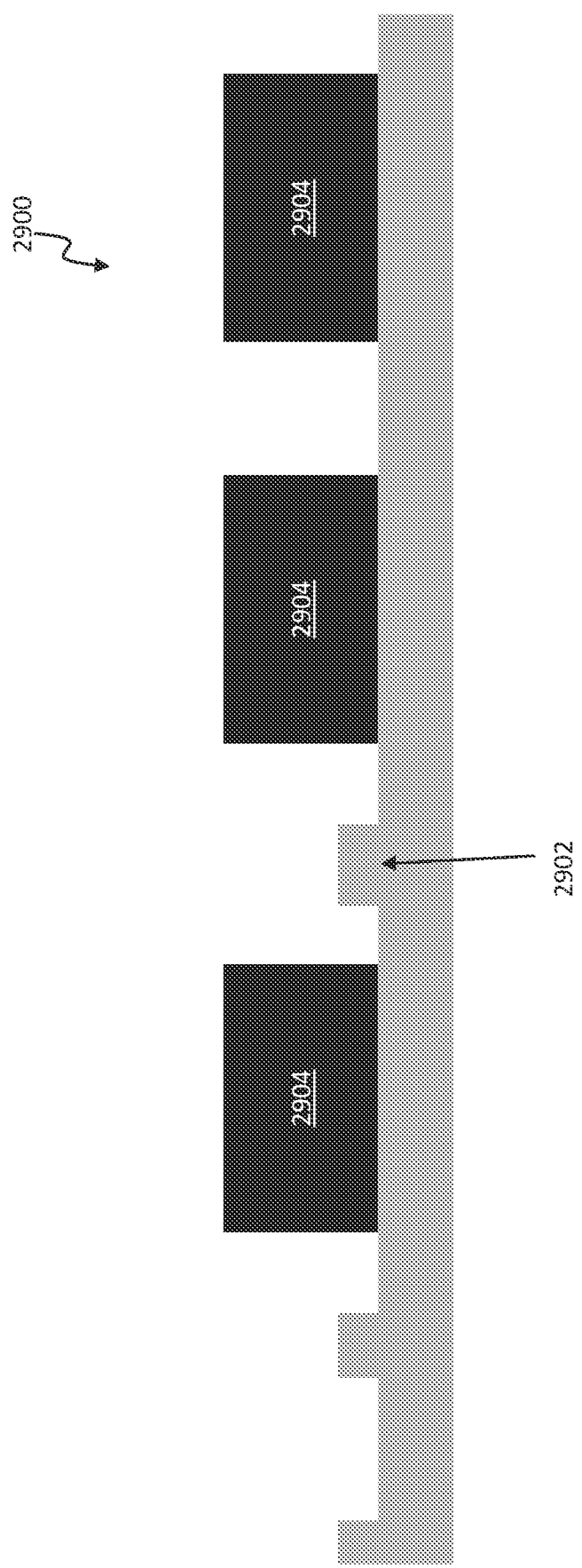
FIG. 29 is a diagram of a cross-sectional view of an example receptacle.

FIG. 29 is a cross-sectional view of an example implementation of a receptacle 2900. The lower profile alignment features 2902 are in glass and are used for vertical alignment. The higher profile alignment features are made of a polymer 2904 and used for lateral alignment.

Figure 30:
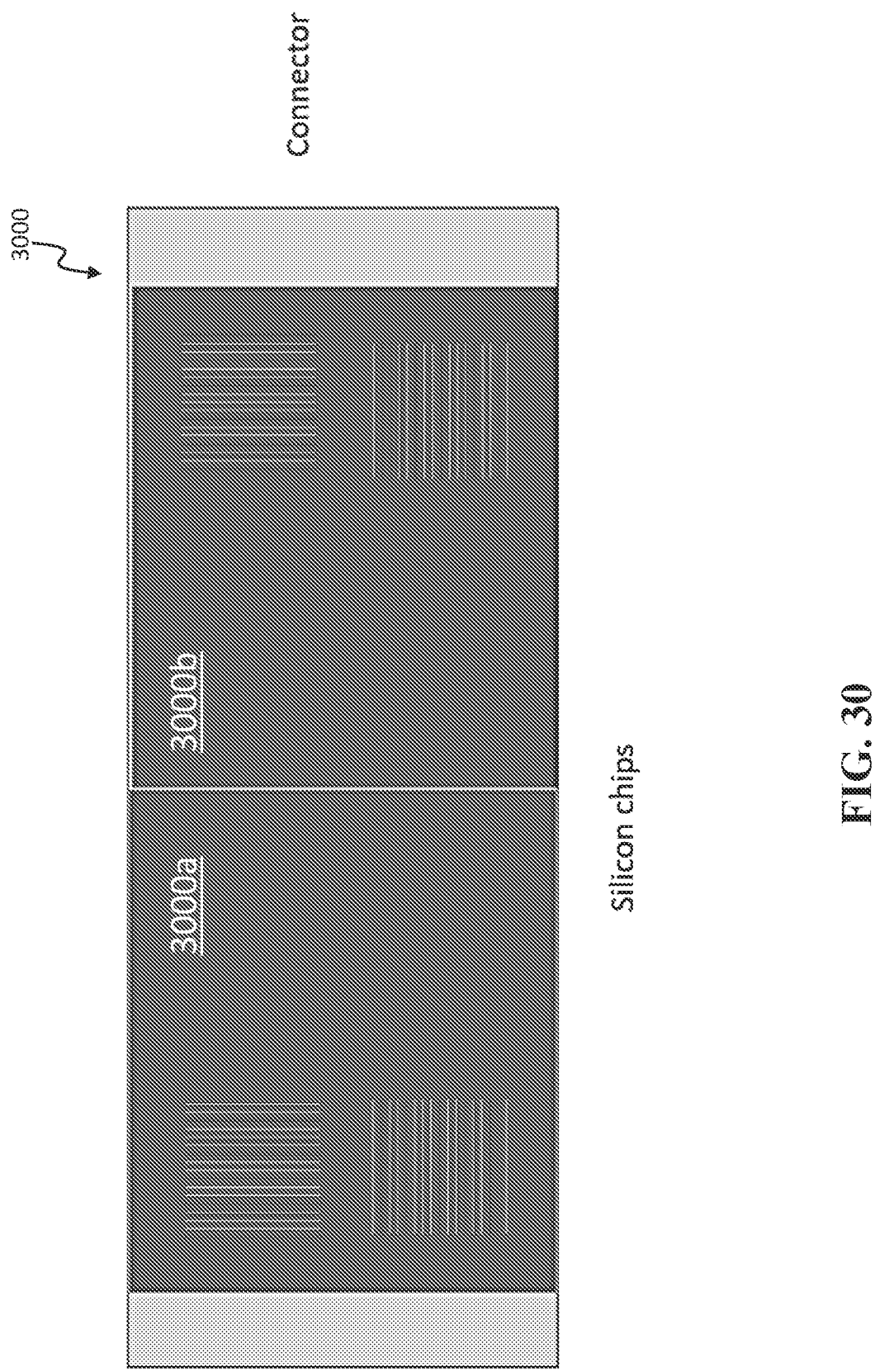
FIG. 30 is a diagram of a top view of example subcircuits aligned to an example receptacle.

FIG. 30 shows a top view example subcircuit(s) 3000a, 3000b aligned to a receptacle 3002. In this case, the alignment features are designed to be a grating of several slits. Note also that the subcircuit(s) 3100a, 3100b are aligned in mirror-image positions relative to one another. In this case, the alignment features are configured as gratings (e.g., repetitive structure) which may give more freedom to configure elastic averaging for the combination.

Figure 31A:
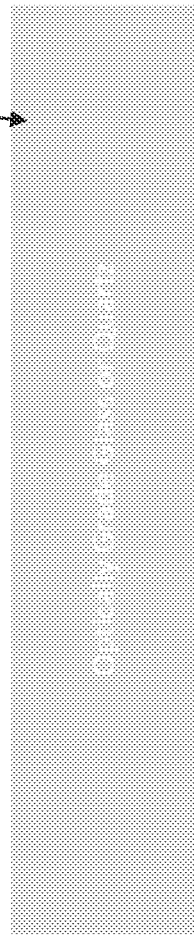
FIGS. 31A-31D are diagrams of cross-sectional views of example fabrication steps for fabricating a receptacle wafer.
Figure 31B:
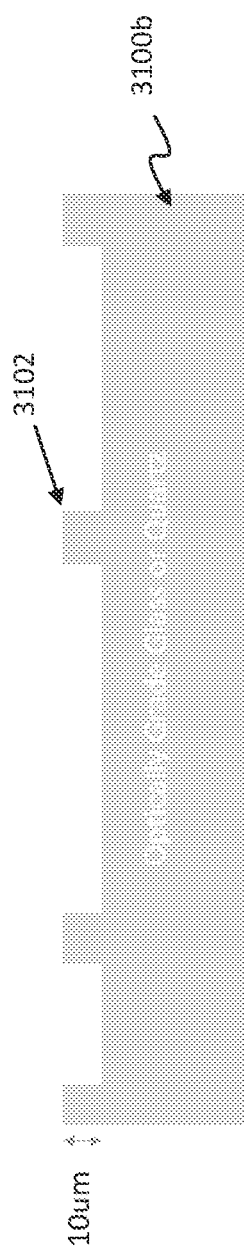
Figure 31C:
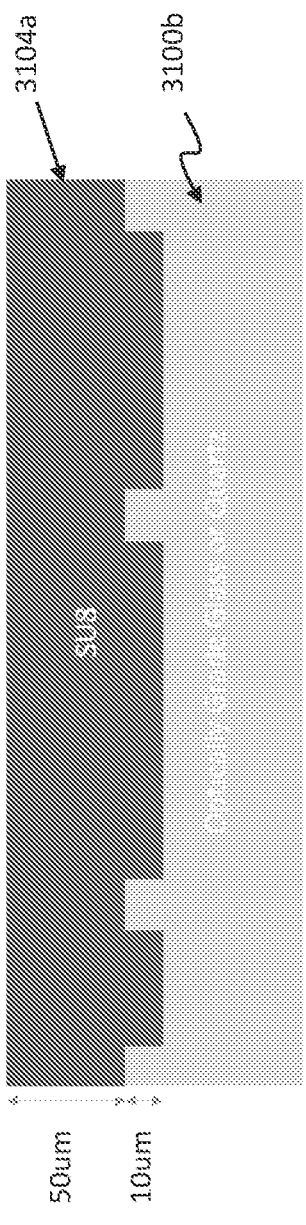
Figure 31D:
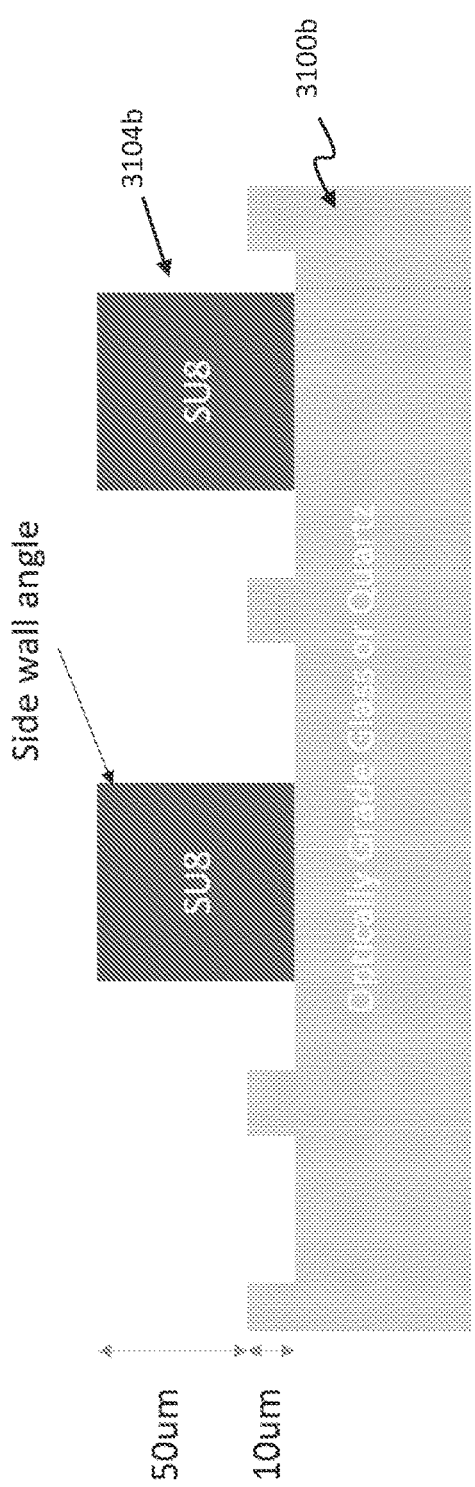
Figure 31E:
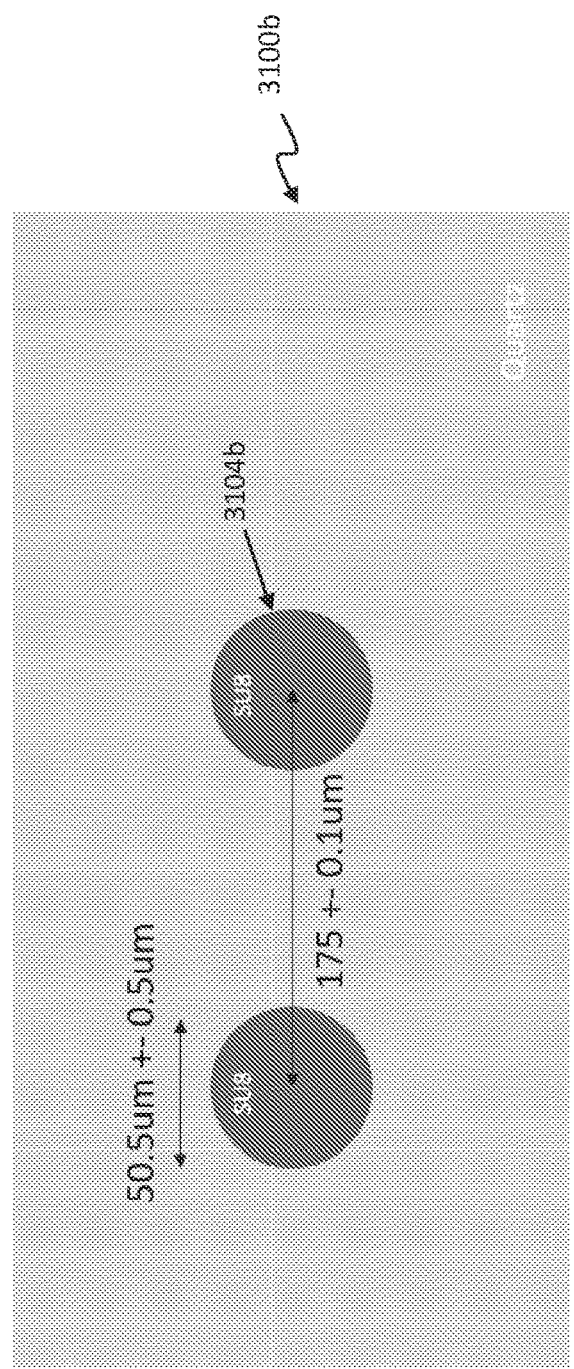
FIG. 31E is a diagram of a top view of FIG. 31D.

FIGS. 31A-31E illustrate example fabrication steps for fabricating a receptacle wafer. FIGS. 31A-31D provide a cross-sectional view while FIG. 31E provides a top view. Referring to FIG. 31A, optical-grade glass or quartz can be used as a starting substrate 3100a. A flat, transparent substrate can make it easy to visually inspect the alignment. Referring to FIG. 31B, a shallow etch (e.g., of 10 um) is performed to define vertical alignment features 3102 in etched substrate 3100b. The vertical alignment features can be etched (for example, a 10 um etch) with an etch that is deeper than the oxide open etch on the subcircuit (typically ranging from 2 um to 9 um). The top of the glass substrate 3100b now acts as the vertical alignment reference point. This may be beneficial since the glass was mechanically polished to be completely flat (e.g., optically grade flat).

In FIG. 31C, the lateral alignment features can be formed in an epoxy or polymer (which is elastic). For instance, a polymer (e.g., SU8) 3104a is spin coated onto the substrate 3100b. In FIG. 31D, the SU8 3104b is patterned to define lateral alignment features. In FIG. 31E, the lateral alignment features are provided in a top view. In this example, each lateral alignment feature is substantially circular with a diameter of 50.5 um+/−0.5 um. These features are separate by 175 um+/−0.1 um.

The side wall angle of these features may be configured for easy insert (positive angle) or for better mechanical stability (negative angle). The width of the lateral alignment feature 3104b may be either the same size, a bit narrower or a bit wider than the pit in the subcircuit. Exactly the same size may be ideal but may not be perfectly achieved. If the lateral alignment feature is a bit wider on the receptacle, then it may need to compress a bit to match the trench width in the subcircuit. Another strategy is to make the receptacle features a bit narrower and offset them from the center position. The latter is shown in FIG. 39 in which the left alignment feature touches the right edge of the sidewall of the subcircuit trench and the right alignment feature touches left edge of the sidewall of the subcircuit. More complex elastic averaging strategies may be implemented. In some embodiments, instead of a quartz or glass substrate, a silicon substrate is used. Other materials and substrates may be used for the substrate. In one example, the receptacles may be 3D printed, given the printer has sufficient accuracy.

Figure 32A:
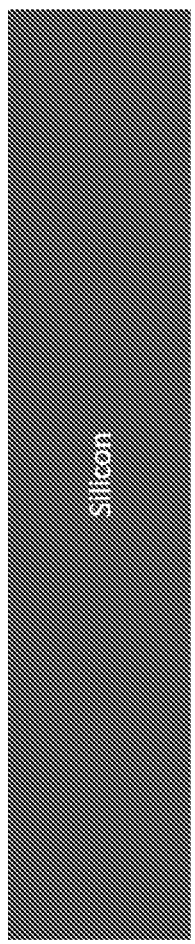
FIGS. 32A-32E are diagrams of cross-sectional views of an example alternative method to fabricate a receptacle.
Figure 32B:
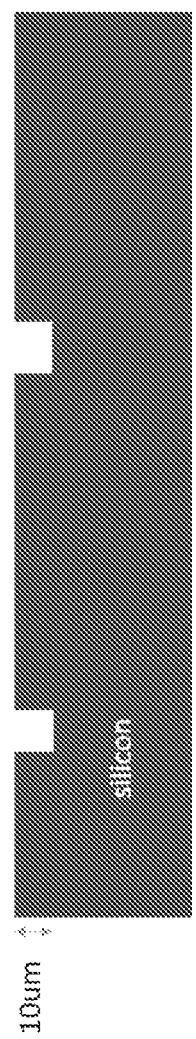
Figure 32C:
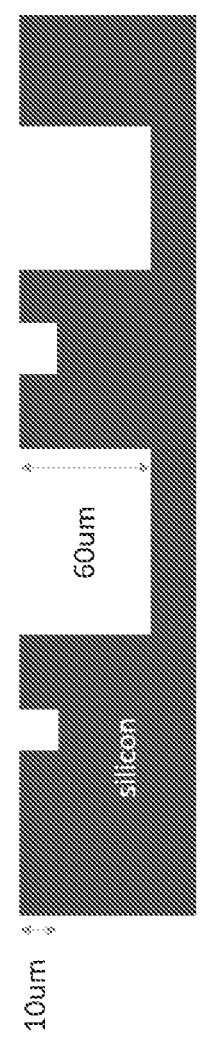
Figure 32D:
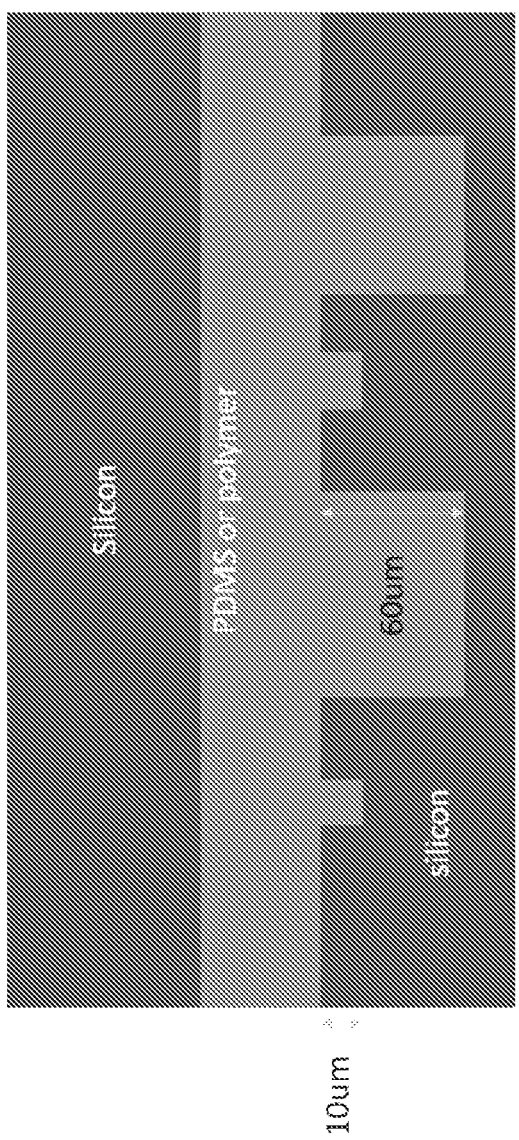
Figure 32E:
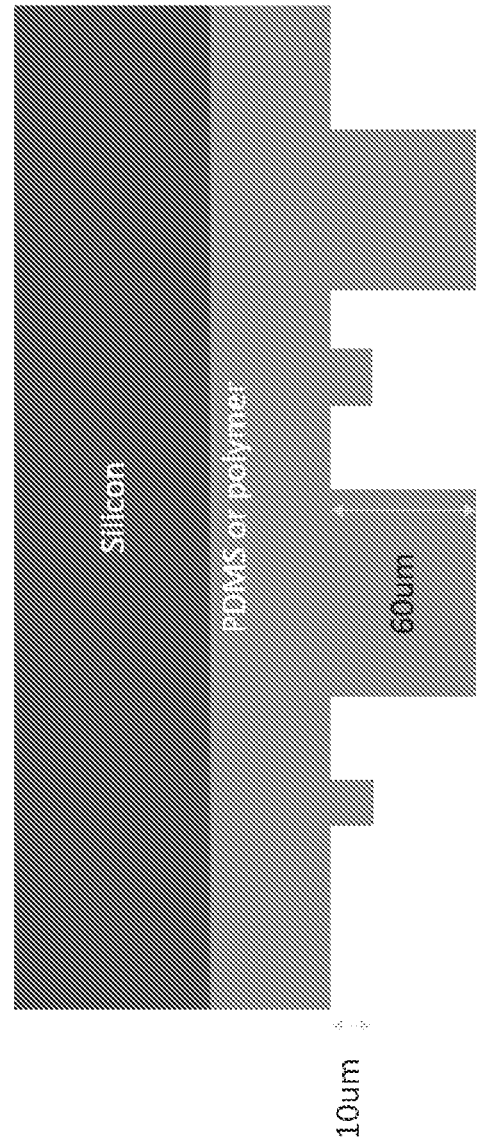

FIGS. 32A-32E illustrate an example alternative method to fabricate a receptacle. FIGS. 32A-32D provide a cross-sectional view while FIG. 32E provides a top view. In FIGS. 32B-32C, the inverse (or mold) is first patterned in a silicon substrate using two etch steps. In FIGS. 32D-32E, using a nanoimprint method, the receptacle is fabricated using the silicon as a mold in PDMS or polymer. One benefit of this approach is that it may reduce the cost of the receptacle itself.

Figure 33A:
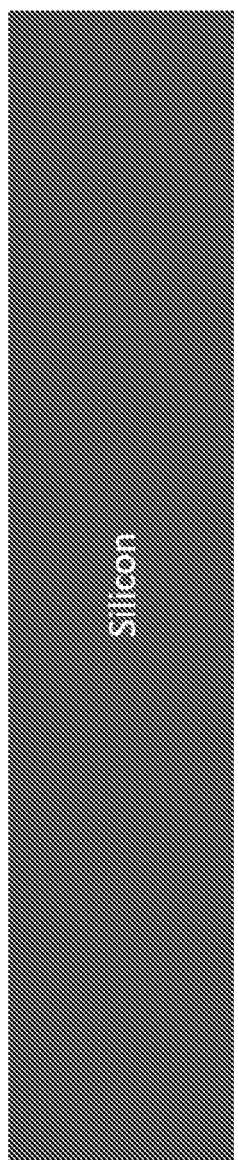
FIGS. 33A-33C are diagrams of cross-sectional views of an example method to fabricate the receptacle directly on a silicon wafer.
Figure 33B:
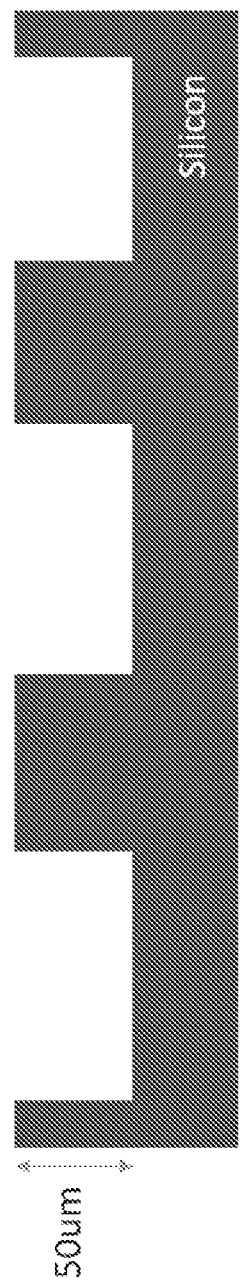
Figure 33C:
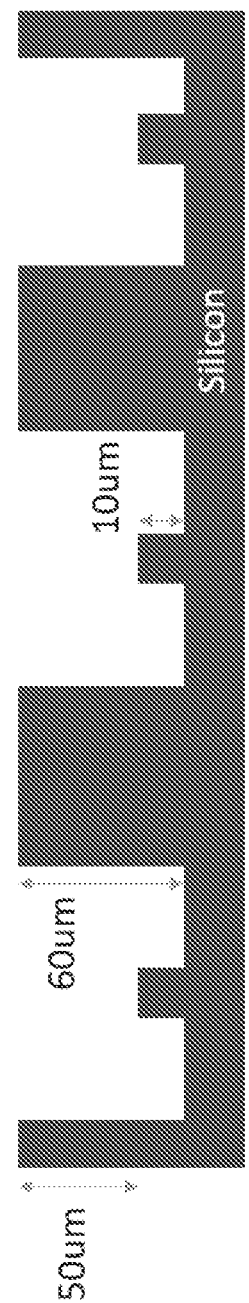

FIGS. 33A-33C illustrate an example method to fabricate the receptacle directly on a silicon wafer. The first etch is then the deepest etch and a second etch is performed to define the vertical alignment features. In FIG. 33B, a deep etch (e.g., of 50 um) is performed. In FIG. 33C, a shallow etch (e.g., of 10 um) is performed into the deep etched pits.

FIG. 34 illustrates an example 3D drawing of a subcircuit 3400 having shallow-etched vertical alignment features 3402 and deep-etched lateral alignment features 3404. The example subcircuit is 2 mm×2 mm with 790 um in thickness. The 3D rendering better illustrates the aspect ratio of the alignment features (deep versus shallow) and the etch depths with respect to the subcircuit thickness.

Figure 35:
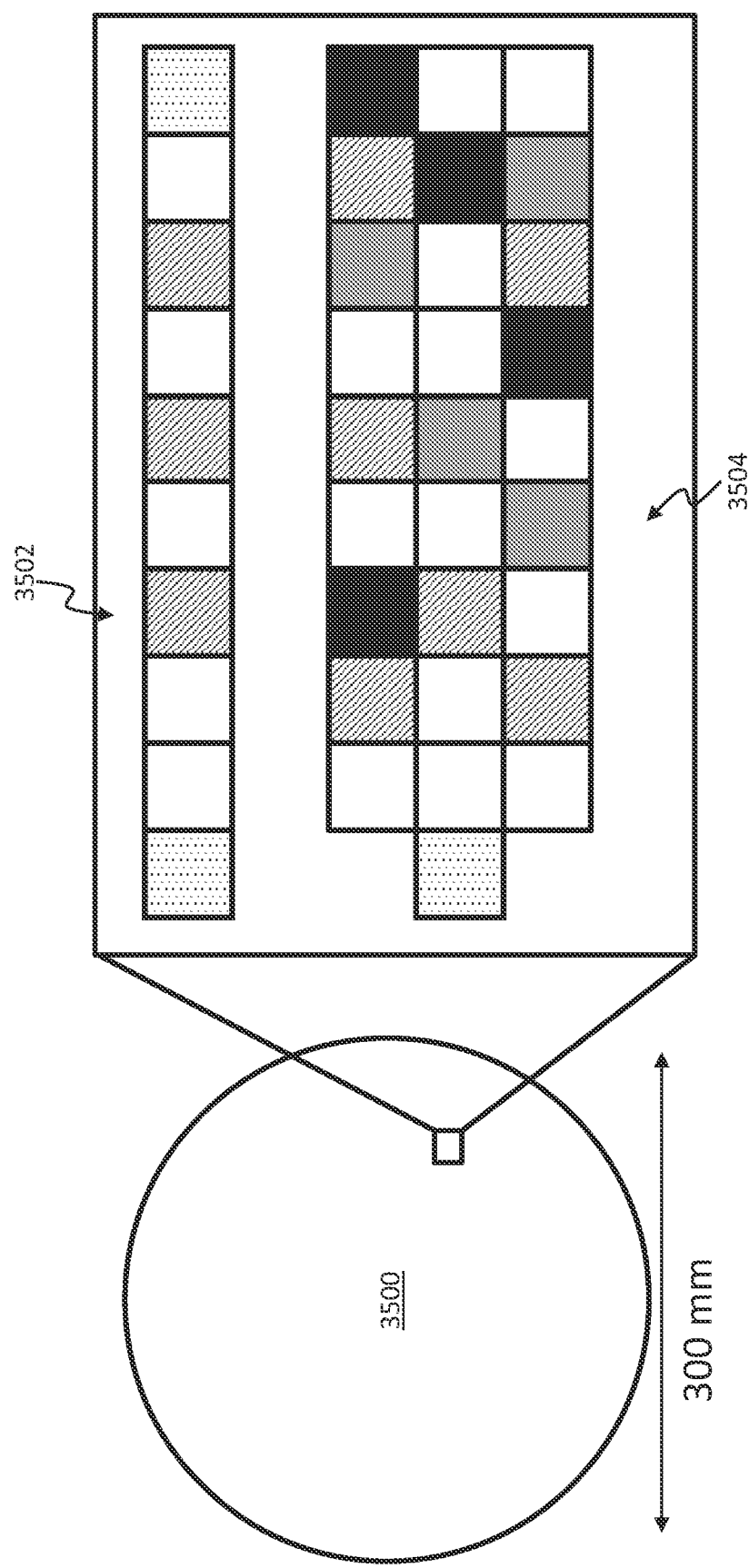
FIG. 35 is a diagram of a top view of an example receptacle wafer including example assemblies of subcircuits.

FIG. 35 illustrates the assemblies 3502, 3504 of subcircuits on a receptacle silicon wafer 3500 which may be either 1-dimensional, 2-dimensional, or 1.5-dimensional. The wafer has a approximately 300 mm diameter. The subcircuits have different colors indicating subcircuits from different processes or technologies.

Figure 36:
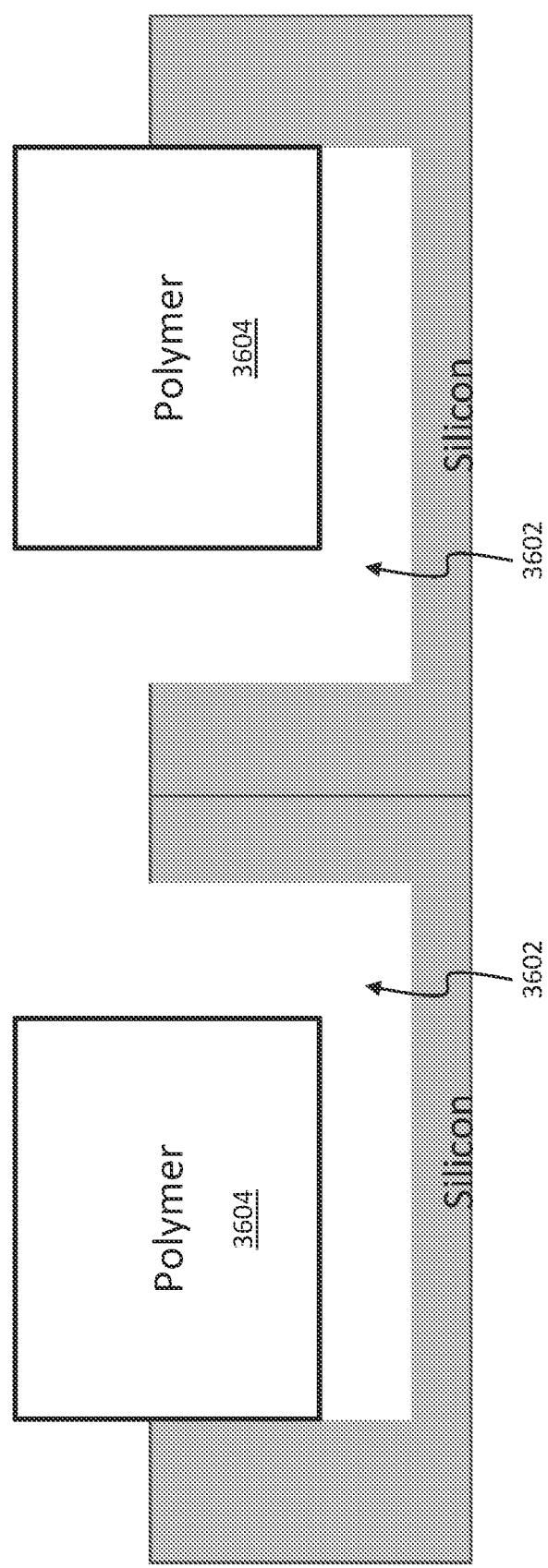
FIG. 36 is a diagram of a cross-sectional view of portions of a receptacle and portions of subcircuits for illustrating a method for elastic averaging.

FIG. 36 illustrates a method for aligning two or more subcircuits by using elastic averaging. As described above, subcircuits and receptacles may have lateral alignment features. For instance, in FIG. 36, the receptacle may have cavities 3602 for receiving lateral alignment features 3604 of subcircuits. For example, the use of a polymer for a lateral alignment feature may be beneficial for elastic averaging. By making the lateral alignment features slightly offset, high lateral alignment accuracy may be achieved. In some embodiments, the subcircuits and receptacles each have multiple (e.g., 10 or less, 20 or less, 30 or less, 50 or less, 100 or less) alignment features, which when offset relative to one another, can create accurate positioning and/or connections by averaging the error inherent to the lateral alignment features.

In some embodiments, the coarse alignment is performed passively while the fine final alignment may be performed actively in one or more degrees of freedom, using either optical feedback or vision feedback using alignment marks. One such implementation is to perform a quick final alignment of one of the lateral axes while the height, tip and tilt are passively constrained. The benefit of this is that alignment stage only needs to be able to move in one of the degrees of freedom and does need to be a hexapod type of device.

Figure 37:
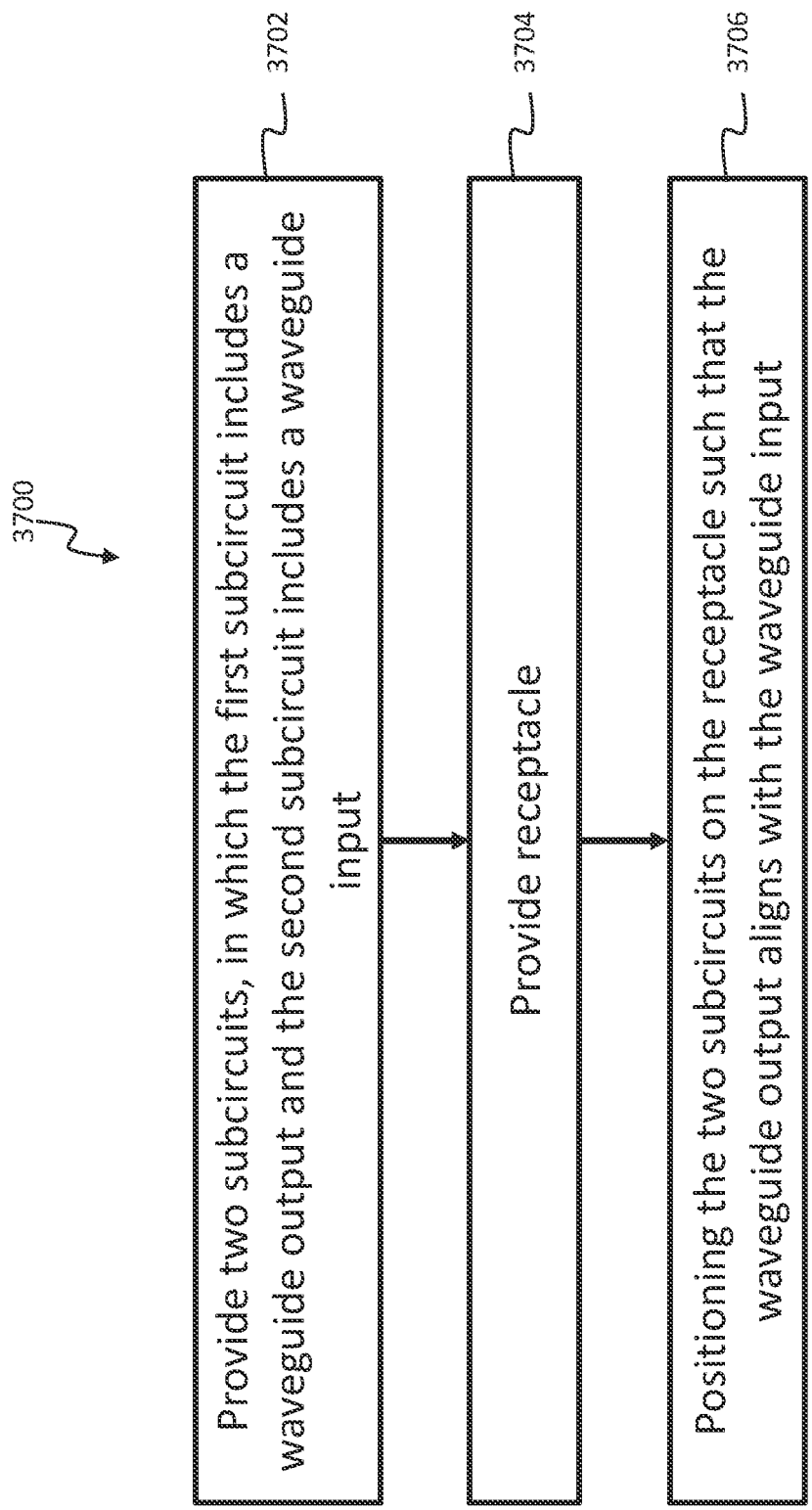
FIG. 37 is a flowchart of a method for aligning two or more subcircuits to a receptacle.

FIG. 37 is a flowchart of an example method 3700 for aligning two or more photonic integrated subcircuits. In step 3702 of method 3700, two or more subcircuits are provided. A first subcircuit may include a waveguide output (e.g., along a first edge) and the second subcircuit can include a waveguide input (e.g., along a second edge). The subcircuit may include at least one subcircuit vertical alignment feature and/or at least one subcircuit lateral alignment feature. In step 3704, at least one receptacle is provided. In some cases, one receptacle is provided for two or more subcircuits. The receptacle may include at least one receptacle vertical alignment feature and/or at least one receptacle lateral alignment feature. The subcircuit vertical alignment feature can be configured to be complementary to the receptacle vertical alignment feature. The subcircuit lateral alignment feature can be configured to be complementary to the receptacle lateral alignment feature. In step 3706, the two subcircuits can be positioned on the receptacle (or the receptacle can be positioned on the two subcircuits) such that the waveguide output of the first subcircuit matches the waveguide input of the second subcircuit. It is understood that the example 3700 method may leverage any embodiment or feature described herein. The subcircuits may be any example embodiment of a subcircuit described herein and/or may include one or more subcircuit features described herein.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described components and systems can generally be integrated together in a single device or system or packaged into multiple devices or systems.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A system comprising:
   a first assembly comprising a first integrated photonics assembly having a first functionality, the first assembly comprising:
      a plurality of subcircuits comprising a plurality of modular photonic integrated subcircuits, wherein:
         each subcircuit is pre-fabricated and is configured to transfer light to and receive light from another subcircuit based on the first functionality;
         an output port of a first subset of the plurality of subcircuits is configured to be aligned with an input port of a second subset of the plurality of subcircuits;
         the input port and the output port are optical ports wherein light is transferred from the output port to the input port with a coupling efficiency greater than 90%; and
         at least one subcircuit is configured to be removed from the first integrated photonics assembly and connected to a second integrated photonics assembly having a second functionality, the first integrated photonics assembly different from the second integrated photonics assembly and the first functionality different from the second functionality.

2. The system of claim 1, wherein each subcircuit of a subset of the plurality of subcircuits is configured to be optically coupled to at least two other subcircuits of the plurality of subcircuits.

3. The system of claim 1, wherein the plurality of subcircuits is arranged in a two-dimensional array such that a first dimension of the two-dimensional array includes at least two subcircuits and a second dimension of the two-dimensional array includes at least two subcircuits.

4. The system of claim 1, wherein each subcircuit has a first length in a first dimension of the subcircuit and a second length in a second dimension of the subcircuit.

5. The system of claim 1, wherein a first subcircuit is disposed relative to a second subcircuit such that at least one of:
   (a) the first subcircuit is disposed immediately adjacent to and co-planar with the second subcircuit; or
   (b) the first subcircuit overlaps with the second subcircuit.

6. The system of claim 1, further comprising:
   an optical fiber configured to carry optical signals between a subcircuit of the plurality of subcircuits and an external device.

7. The system of claim 1, wherein at least two subcircuits are configured to transfer and receive light via butt-coupling.

8. The system of claim 7, wherein at least one additional subcircuit is configured to transfer and receive light to one of the at least two subcircuits via at least one of:
(i) one or more optical fibers;
(ii) one or more photonic wirebonds;
(iii) a free-space optical train;
(iv) adiabatic coupling; or
(v) out-of-plane coupling.

9. The system of claim 1, wherein at least two subcircuits are configured to transfer and receive light via at least one of:
(i) butt-coupling;
(ii) one or more optical fibers;
(iii) one or more photonic wirebonds;
(iv) a free-space optical train;
(v) adiabatic coupling; or
(vi) out-of-plane coupling.

10. The system of claim 1, further comprising a plurality of monitoring circuits, wherein:
each monitoring circuit is coupled to a respective one of a subset of the plurality of subcircuits, each monitoring circuit comprises a first light path between an input and an output of the subcircuit, and each monitoring circuit is configured to monitor optical loss in the first light path.

11. The system of claim 10, wherein, based on the monitored optical loss, at least one monitoring circuit of the plurality of monitoring circuits is configured to determine at least one of (i) a coupling efficiency or (ii) a degree of alignment between a respective subcircuit and another subcircuit immediately adjacent to the respective subcircuit.

12. The system of claim 10, wherein each monitoring circuit comprises a second light path configured to monitor light transferred in an opposite direction from light transferred in the first light path.

13. The system of claim 10, further comprising a second plurality of monitoring circuits, wherein:
each second monitoring circuit is coupled to the respective one of the subset of the plurality of subcircuits, each second monitoring circuit comprises a light path between an input and an output of the subcircuit, and each second monitoring circuit is configured to monitor optical loss in the light path.

14. The system of claim 10, further comprising:
a fiber optic array configured to transfer light via an optical path to at least one monitoring circuit of the plurality of monitoring circuits.

15. The system of claim 1, further comprising a receptacle configured align at least two subcircuits of the plurality of subcircuits.

16. The system of claim 15, wherein a surface of the receptacle comprises at least one alignment feature, the at least one alignment feature configured to effectuate alignment between a first subcircuit and a second subcircuit of the at least two subcircuits.

17. The system of claim 16, wherein the at least one alignment feature effectuates at least one of (a) a lateral alignment, (b) a vertical alignment, or (c) an angular alignment between a first subcircuit and a second-subcircuit of the at least two subcircuits.

18. The system of claim 16, wherein a surface of each of the at least two subcircuits forms a cavity configured to receive the at least one alignment feature of the receptacle.

19. The system of claim 18, wherein the cavity is a deep etch, a V-groove, or an oxide open.

20. A system comprising:
a first assembly comprising a first integrated photonics assembly having a first functionality, the first assembly comprising:
a plurality of subcircuits comprising a plurality of modular photonic integrated subcircuits, wherein:
each subcircuit is pre-fabricated and is configured to transfer light to and receive light from another subcircuit based on the first functionality;
an output port of a first subset of the plurality of subcircuits is configured to be aligned with an input port of a second subset of the plurality of subcircuits;
for the first subset of the plurality of subcircuits, the output port is configured at a particular position along a first edge of the first subset, and for the second subset of the plurality of subcircuits, the input port is configured at a particular position along a second edge of the second subset; and
at least one subcircuit is configured to be removed from the first integrated photonics assembly and connected to a second integrated photonics assembly having a second functionality, the first integrated photonics assembly different from the second integrated photonics assembly and the first functionality different from the second functionality.

21. The system of claim 20, wherein each subcircuit of a subset of the plurality of subcircuits is configured to be optically coupled to at least two other subcircuits of the plurality of subcircuits.

22. The system of claim 20, wherein the plurality of subcircuits is arranged in two-dimensional array such that a first dimension of the two-dimensional array includes at least two subcircuits and a second dimension of the two-dimensional array includes at least two subcircuits.

23. The system of claim 20, wherein each subcircuit has a first length in a first dimension of the subcircuit and a second length in a second dimension of the subcircuit.

24. A system comprising:
a first assembly comprising a first integrated photonics assembly having a first functionality, the first assembly comprising:
a plurality of subcircuits comprising a plurality of modular photonic integrated subcircuits, wherein:
each subcircuit is pre-fabricated and is configured to transfer light to and receive light from another subcircuit based on the first functionality;
an output port of a first subset of the plurality of subcircuits is configured to be aligned with an input port of a second subset of the plurality of subcircuits;
at least two subcircuits are configured to transfer and receive light via butt-coupling; and
at least one subcircuit is configured to be removed from the first integrated photonics assembly and connected to a second integrated photonics assembly having a second functionality, the first integrated photonics assembly different from the second integrated photonics assembly and the first functionality different from the second functionality.

25. The system of claim 24, wherein each subcircuit of a subset of the plurality of subcircuits is configured to be optically coupled to at least two other subcircuits of the plurality of subcircuits.

26. The system of claim 24, wherein the plurality of subcircuits is arranged in two-dimensional array such that a first dimension of the two-dimensional array includes at least two subcircuits and a second dimension of the two-dimensional array includes at least two subcircuits.

27. The system of claim 24, wherein each subcircuit has a first length in a first dimension of the subcircuit and a second length in a second dimension of the subcircuit.

28. A system comprising:
a first assembly comprising a first integrated photonics assembly having a first functionality, the first assembly comprising:
   a plurality of subcircuits comprising a plurality of modular photonic integrated subcircuits, wherein:
      each subcircuit is pre-fabricated and is configured to transfer light to and receive light from another subcircuit based on the first functionality;
      an output port of a first subset of the plurality of subcircuits is configured to be aligned with an input port of a second subset of the plurality of subcircuits; and
      at least one subcircuit is configured to be removed from the first integrated photonics assembly and connected to a second integrated photonics assembly having a second functionality, the first integrated photonics assembly different from the second integrated photonics assembly and the first functionality different from the second functionality; and
a plurality of monitoring circuits, wherein:
   each monitoring circuit is coupled to a respective one of a subset of the plurality of subcircuits;
   each monitoring circuit comprises a first light path between an input and an output of the subcircuit; and
   each monitoring circuit is configured to monitor optical loss in the first light path.

29. The system of claim 28, wherein each subcircuit of a subset of the plurality of subcircuits is configured to be optically coupled to at least two other subcircuits of the plurality of subcircuits.

30. The system of claim 28, wherein the plurality of subcircuits is arranged in two-dimensional array such that a first dimension of the two-dimensional array includes at least two subcircuits and a second dimension of the two-dimensional array includes at least two subcircuits.

31. The system of claim 28, wherein each subcircuit has a first length in a first dimension of the subcircuit and a second length in a second dimension of the subcircuit.

\* \* \* \* \*